US012700675B2

(12) United States Patent
Zhu et al.

(10) Patent No.: US 12,700,675 B2
(45) Date of Patent: Aug. 4, 2026

(54) ANTENNA ELEMENT AND ELECTRONIC DEVICE

(71) Applicant: Huawei Technologies Co., Ltd., Shenzhen (CN)

(72) Inventors: Naida Zhu, Shenzhen (CN); Pengfei Wu, Shanghai (CN); Yu Yao, Shanghai (CN); Youquan Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/881,187

(22) PCT Filed: Jun. 30, 2023

(86) PCT No.: PCT/CN2023/104915

§ 371 (c)(1),
(2) Date: Jan. 3, 2025

(87) PCT Pub. No.: WO2024/007996

PCT Pub. Date: Jan. 11, 2024

(65) Prior Publication Data

US 2026/0011923 A1 Jan. 8, 2026

(30) Foreign Application Priority Data

Jul. 7, 2022 (CN) ......................... 202210802163.6

(51) Int. Cl.
*H01Q 9/04* (2006.01)
*H01Q 5/307* (2015.01)

(52) U.S. Cl.
CPC ........... *H01Q 9/0421* (2013.01); *H01Q 5/307* (2015.01); *H01Q 9/0414* (2013.01)

(58) Field of Classification Search
CPC .... H01Q 9/0421; H01Q 5/307; H01Q 9/0414; H01Q 5/385; H01Q 1/38; H01Q 19/005
See application file for complete search history.

(56) References Cited

U.S. PATENT DOCUMENTS 6,133,882 A * 10/2000 LaFleur ............... H01Q 21/065 343/846
2019/0006759 A1 1/2019 Yang
(Continued)

FOREIGN PATENT DOCUMENTS

CN 110783702 A 2/2020
EP 4050734 A1 8/2022
JP 2012204916 A * 10/2012 ........... H01Q 19/005

OTHER PUBLICATIONS

S. X. Ta, N. Nguyen-Trong, V. C. Nguyen, K. K. Nguyen and C. Dao-Ngoc, "Broadband Dual-Polarized Antenna Using Metasurface for Full-Duplex Applications," in IEEE Antennas and Wireless Propagation Letters, vol. 20, No. 2, pp. 254-258, Feb. 2021, doi: 10.1109/LAWP.2020.3047231.

*Primary Examiner* — Dieu Hien T Duong
(74) *Attorney, Agent, or Firm* — Slater Matsil, LLP

(57) ABSTRACT

Antenna elements and electronic devices are provided, including an antenna element includes a first radiator, a second radiator, and a radiator array. The first radiator is connected to a ground plane through a grounding component, the second radiator is spaced from the ground plane and disposed opposite to the ground plane, and the second radiator and the first radiator are spaced apart. The radiator array is spaced from the first radiator and disposed opposite to the first radiator, and is located on a side that is of the first radiator and that is further from the ground plane. The radiator array includes at least two sub-radiators, and the at least two sub-radiators are spaced from each other in an extension direction of a plane on which the radiator array is located. The first radiator includes a first hollow region, and the radiator array includes a second hollow region.

20 Claims, 12 Drawing Sheets

(56) References Cited

U.S. PATENT DOCUMENTS

| | | | | |
|---|---|---|---|---|
| 2022/0368028 | A1* | 11/2022 | Govoni | H01Q 25/02 |
| 2023/0112892 | A1* | 4/2023 | Choi | H01Q 21/0006 343/702 |

* cited by examiner

ANTENNA ELEMENT AND ELECTRONIC DEVICE

CROSS-REFERENCE TO RELATED APPLICATIONS

This application is a National Stage of International Application No. PCT/CN2023/104915, filed on Jun. 30, 2023, which claims priority to Chinese Patent Application No. 202210802163.6, filed on Jul. 7, 2022, both of which are hereby incorporated by reference in their entireties.

TECHNICAL FIELD

This application relates to the field of antennas, and in particular, to an antenna element and an electronic device.

BACKGROUND

With an update of terminal technologies and a need to meet market requirements, miniaturization of terminal devices gradually becomes a common goal in the industry. An increasingly small size of a terminal device brings a great challenge to disposing an antenna in the terminal device.

A millimeter-wave antenna is used as an example. When the millimeter-wave antenna is disposed at a lower part of a rear cover of the terminal device, a lower antenna profile (which may be understood as a height of the antenna) is more conducive to miniaturization of the antenna and the terminal device. However, reduction of the antenna profile (which may be understood as reduction of the height of the antenna) affects antenna performance (for example, a bandwidth of the antenna).

In the conventional technology, to alleviate adverse impact of profile reduction on antenna performance, a size of a radiator may be increased, to reduce a Q value of the antenna, so as to improve antenna performance (for example, the bandwidth of the antenna). However, an increase in the size of the radiator increases space occupied by the antenna in the terminal device, and therefore is not conducive to miniaturization of the antenna.

It can be learned that, in the conventional technology, it is difficult to balance miniaturization and high performance (for example, a wide bandwidth) of the antenna.

SUMMARY

Embodiments of this application provide an antenna element and an electronic device, to resolve a problem that miniaturization and high performance (for example, a wide bandwidth) of an antenna are difficult to balance in the conventional technology.

This application provides an antenna element, including a first radiator and a grounding component, where in a height direction of the antenna element, the first radiator is spaced from a ground plane and disposed opposite to the ground plane, and the first radiator is connected to the ground plane through the grounding component; a second radiator, where the second radiator is spaced from the first radiator, and in the height direction of the antenna element, the second radiator is spaced from the ground plane and disposed opposite to ground plane; and a radiator array, where in the height direction of the antenna element, the radiator array is spaced from the first radiator and disposed opposite to the first radiator, and is located on a side that is of the first radiator and that is away from the ground plane; and the radiator array includes at least two sub-radiators, and the at least two sub-radiators are spaced from each other in an extension direction of a plane on which the radiator array is located.

The first radiator has a first hollow region, and the radiator array has a second hollow region.

A plane parallel to a plane on which the ground plane is located is used as a projection plane, a projection of the first radiator on the projection plane is a first projection, a projection of the second radiator on the projection plane is a second projection, and a projection of the radiator array on the projection plane is a third projection; and the first projection and the third projection at least partially overlap, at least a part of the second projection is located within a contour line formed by the first hollow region on the projection plane, and at least a part of the second projection is located within a contour line formed by the second hollow region on the projection plane. The first radiator is provided with a first feeding connection point, the second radiator is provided with a second feeding connection point, the first feeding connection point is connected to a first feed point, and the second feeding connection point is connected to a second feed point.

The antenna element in embodiments of this application can generate one resonance through the first radiator and generate another resonance through the radiator array in a lower operating frequency band (for example, a millimeter wave frequency band of 24 GHz or a millimeter wave frequency band of 28 GHz). In this way, the antenna element has two resonances in the low operating frequency band, to broaden a bandwidth of the antenna element during operation in a low frequency band. In addition, the antenna element in embodiments of this application can further generate one resonance through the second radiator and can generate another resonance through the first radiator and the radiator array in a higher operating frequency band (for example, a millimeter wave frequency band of 39 GHz or a millimeter wave frequency band of 60 GHz). In this way, the antenna element has two resonances in the higher operating frequency band, to broaden a bandwidth of the antenna element during operation in a high frequency band. It can be learned that the antenna element in embodiments of this application is not only applicable to a plurality of frequency bands, but also has a wide bandwidth in each frequency band.

Further, when a same antenna profile (which may be understood as a height of an antenna) is used, the antenna element in this application has a higher bandwidth. It may also be understood as follows: When a same bandwidth requirement is met, the antenna element in embodiments of this application has a lower antenna profile (which may be understood as a height of an antenna). This facilitates miniaturization of the antenna and helps implement miniaturization of an electronic device.

In some embodiments, in the height direction of the antenna element, a spacing between the first radiator and the radiator array is a spacing d1, where 0.0084 time a dielectric wavelength corresponding to a center frequency of a first operating frequency band of the antenna element≤an electrical length of the spacing d1≤0.05 time the dielectric wavelength corresponding to the center frequency of the first operating frequency band of the antenna element.

In some possible embodiments, 0.05 mm≤a physical length of the spacing d1≤0.3 mm.

In some possible embodiments, in the height direction of the antenna element, a spacing between the first radiator and the ground plane is a spacing d2, where 0.0168 time the dielectric wavelength corresponding to the center frequency of the first operating frequency band of the antenna element≤an electrical length of the spacing d2≤0.117 time the dielectric wavelength corresponding to the center frequency of the first operating frequency band of the antenna element.

In some possible embodiments, 0.1 mm≤a physical length of the spacing d2≤0.7 mm.

In some embodiments, when the antenna element is in the first operating frequency band, the first radiator can be excited to generate a first resonance, and the radiator array can be excited to generate a second resonance. When the antenna element is in a second operating frequency band, the second radiator can be excited to generate a third resonance, and the first radiator and the radiator array can be excited to generate a fourth resonance.

In some possible embodiments, the first operating frequency band and the second operating frequency band are different operating frequency bands.

In some possible embodiments, a part of the first operating frequency band overlaps a part of the second operating frequency band, and another part of the first operating frequency band is lower than another part of the second operating frequency band.

In some possible embodiments, the first operating frequency band does not overlap the second operating frequency band at all, and the first operating frequency band is lower than the second operating frequency band.

In some possible embodiments, the antenna element further includes a first feeding part and a second feeding part. Two ends of the first feeding part are respectively connected to the first feeding connection point and the first feed point, and two ends of the second feeding part are respectively connected to the second feeding connection point and the second feed point.

In some possible implementations, the radiator array includes two sub-radiators. The two sub-radiators are distributed on two sides of the second radiator in a first direction. A gap between the two sub-radiators in the first direction is used as the second hollow region. The first feeding connection point and the second feeding connection point are distributed in the first direction. The first direction is parallel to a plane on which the second radiator is located.

In some embodiments, the radiator array is of an axisymmetric structure. The radiator array is ring-shaped. The radiator array includes N sub-radiator groups.

Each sub-radiator group includes a plurality of sub-radiators. In the extension direction of the plane on which the radiator array is located, the plurality of sub-radiators in each sub-radiator group are spaced from each other and are adjacent to each other from head to tail to form a ring structure. N is greater than or equal to 1.

In some embodiments, N is greater than or equal to 2. N ring structures formed by the N sub-radiator groups are concentrically disposed on a same plane, and form a multi-layer ring structure. Inner space enclosed by an innermost ring structure in the N ring structures is used as the second hollow region.

In some embodiments, the second projection is completely located within the contour line formed by the second hollow region on the projection plane, and the second projection is completely located within the contour line formed by the first hollow region on the projection plane.

In some embodiments, the first radiator is further provided with a third feeding connection point, and the third feeding connection point is connected to a third feed point. The second radiator is further provided with a fourth feeding connection point. The fourth feeding connection point is connected to a fourth feed point.

An included angle between a connection line from the first feeding connection point to a center point of the first radiator and a connection line from the third feeding connection point to the center point of the first radiator is 90°.

An included angle between a connection line from the second feeding connection point to a center point of the second radiator and a connection line from the fourth feeding connection point to the center point of the second radiator is 90°.

By using the foregoing technical solutions, dual polarization can be implemented when the antenna element operates in both the low frequency band and the high frequency band. This helps improve a signal-to-noise ratio of the antenna element, thereby improving a channel capacity.

In some possible embodiments, the antenna element further includes a third feeding part and a fourth feeding part. Two ends of the third feeding part are respectively connected to the third feeding connection point and the third feed point, and two ends of the fourth feeding part are respectively connected to the fourth feeding connection point and the fourth feed point.

In some embodiments, the first radiator is ring-shaped, and the first radiator is of an axisymmetric structure. The grounding component is of a ring-shaped columnar structure, one end of the grounding component is connected to an inner edge of the first radiator, and the other end of the grounding component is connected to the ground plane; or the grounding component includes a plurality of grounding posts spaced in a circumferential direction of an inner edge of the first radiator, and a first end of each of the plurality of grounding posts is connected to the inner edge of the first radiator.

In some embodiments, the plurality of grounding posts are evenly spaced in the circumferential direction of the inner edge of the first radiator.

In some embodiments, the first radiator has a first axis of symmetry and a second axis of symmetry that are perpendicular to each other, and the first radiator, the second radiator, and the radiator array are all symmetrical with respect to the first axis of symmetry and the second axis of symmetry. In addition, a central axis of the first radiator, a central axis of the second radiator, and a central axis of the radiator array coincide.

In some embodiments, the first radiator, the second radiator, and the radiator array are all sheet-like radiators.

This application further provides an electronic device, including the antenna element according to the foregoing embodiments and possible embodiments.

Because the antenna element in embodiments of this application has a lower antenna profile (which may be understood as a height of an antenna) when a same bandwidth requirement is met, the antenna element in embodiments of this application occupies small space in the electronic device. This helps implement miniaturization of the electronic device.

In some embodiments, the electronic device includes a plurality of antenna elements, and the plurality of antenna elements are distributed in an array form in the electronic device.

In some embodiments, the electronic device further includes a dielectric structure. The first radiator, the second radiator, and the radiator array are all disposed in the dielectric structure.

In some embodiments, the electronic device further includes a rear cover and a dielectric structure. The radiator array is attached to a surface that is of the rear cover and that faces an interior of the electronic device. The first radiator and the second radiator are disposed in the dielectric structure.

In some embodiments, the electronic device further includes the rear cover and a metal fence structure, the rear cover is disposed opposite to the antenna element, and the metal fence structure presses against the rear cover and the ground plane, to enclose the antenna element in space formed by the metal fence structure, the rear cover, and the ground plane.

In some embodiments, the first radiator includes a conductive member disposed in the electronic device, the second radiator includes a conductive member disposed in the electronic device, and the radiator array includes a conductive member disposed in the electronic device.

Alternatively, the first radiator includes a part of a conductive layer of a PCB board, the second radiator includes a part of a conductive layer of the PCB board, the radiator array includes a part of a conductive layer of the PCB board, and the ground plane includes a part of a grounding plane of the PCB board.

REFERENCE NUMERALS

Figure 1:
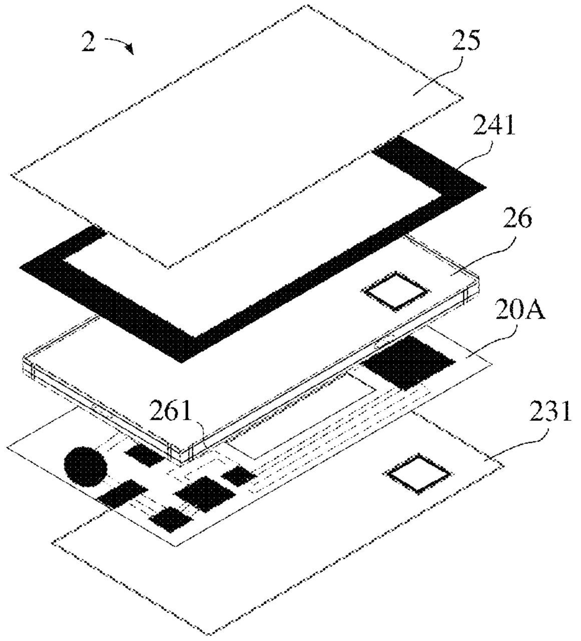
FIG. 1 shows an example of an electronic device according to an embodiment of this application.

1: antenna element;

11: first radiator; 12: second radiator; 13: radiator array; 132: sub-radiator; 133: rectangular ring; 134: rectangular ring; 132A: sub-radiator; 132B: sub-radiator; 132C: sub-radiator; 132D: sub-radiator;

2: electronic device;

20A: PCB board; 20: ground plane; 201: dielectric structure; 202: dielectric structure; 21: grounding component; 211: grounding post; 211': grounding component; 211": grounding component; 221: feeding part; 222: feeding part; 223: feeding part; 224: feeding part; 231: rear cover; 241: display/module; 25: cover plate; 26: middle frame; 261: side frame; 27: metal fence structure; 271: protruding part; 28: foam;

A1: first feeding connection point; A2: second feeding connection point; A3: third feeding connection point; A4: fourth feeding connection point;

T1: first projection; T2: second projection; T3: third projection; S1: first hollow region; S2: second hollow region; M1: contour line; M2: contour line; O1: center point; O2: central point; F1: first axis of symmetry; F2: second axis of symmetry;

H: height direction; L: length direction.

DETAILED DESCRIPTION OF ILLUSTRATIVE EMBODIMENTS

The following describes implementations of this application by using specific embodiments. A person skilled in the art may easily understand other advantages and effect of this application based on content disclosed in this specification. Although this application is described with reference to some embodiments, it does not mean that a characteristic of this application is limited only to this implementation. On the contrary, a purpose of describing this application with reference to an implementation is to cover another option or modification that may be derived based on claims of this application. To provide a deep understanding of this application, the following descriptions include many specific details. This application may be alternatively implemented without using these details. In addition, to avoid confusion or obfuscation of a focus of this application, some specific details are omitted from the descriptions. It should be noted that embodiments in this application and the features in embodiments may be mutually combined in the case of no conflict.

It should be noted that, in this specification, similar reference numerals and letters in the following accompanying drawings indicate similar items. Therefore, once an item is defined in an accompanying drawing, the item does not need to be further defined or interpreted in following accompanying drawings.

The following describes terms that may occur in embodiments of this application.

In descriptions of this application, it is to be noted that orientation or location relationships indicated by terms "center", "above", "below", "left", "right", "vertical", "horizontal", "inner", "outer", and the like are orientation or location relationships based on the accompanying drawings, and are merely intended for conveniently describing this application and simplifying descriptions, rather than indicating or implying that an apparatus or an element in question needs to have a specific orientation or needs to be constructed and operated in a specific orientation, and therefore cannot be construed as a limitation on this application. In addition, terms "first" and "second" are merely used for a purpose of description, and shall not be understood as an indication or implication of relative importance.

In descriptions of this application, it should be noted that unless otherwise expressly specified and limited, terms "mount", "interconnect", and "connect" should be understood in a broad sense. For example, such terms may indicate a fixed connection, a detachable connection, or an integral connection; may indicate a mechanical connection or an electrical connection; and may indicate direct interconnection, indirect interconnection through an intermediate medium, or internal communications between two elements. For a person of ordinary skill in the art, a specific meaning of the foregoing terms in this application may be understood based on a specific situation.

Opposite disposition: The opposite disposition may be understood as face-to-face (opposite to, or face to face) disposition or disposition in which at least some regions overlap in a direction. In an embodiment, two oppositely disposed radiators are disposed adjacent to each other, and no other radiator is disposed between the two radiators.

Coupling: The coupling may be understood as direct coupling and/or indirect coupling, and a "coupling connection" may be understood as a direct coupling connection and/or an indirect coupling connection. The direct coupling may also be referred to as an "electrical connection". The "electrical connection" may be understood as physical contact and electrical conduction of components. It may also be understood as a form in which different components in a line structure are connected through physical lines that can transmit an electrical signal, such as a printed circuit board (printed circuit board, PCB) copper foil or a conducting wire. The "indirect coupling" may be understood as that two conductors are electrically conducted in a spaced/non-contact manner. In an embodiment, the indirect coupling may also be referred to as capacitive coupling. For example, signal transmission is implemented by forming equivalent capacitor through coupling of a gap between two conductive components.

Ground/ground plane: The ground/ground plane may generally mean at least a part of any grounding plane, or grounding plate, or grounding metal layer of an electronic device (for example, a mobile phone), or at least a part of any combination of the any grounding plane, grounding plate, grounding component, or the like. The "ground/ground plane" may be configured to ground a component of the electronic device. In an embodiment, the "ground/ground plane" may include any one or more of the following: A grounding plane of a circuit board of an electronic device, a grounding plate formed by a middle frame of the electronic device, a grounding metal layer formed by a metal film below a screen, a conductive grounding plane of a battery, and a conductive member or metal part electrically connected to the grounding plane/grounding plate/metal layer. In an embodiment, the circuit board may be a printed circuit board (printed circuit board, PCB), for example, an 8-layer board, a 10-layer board, or a 12-layer board, a 13-layer board, or a 14-layer board respectively having 8, 10, 12, 13, or 14 layers of conductive materials, or a component that is separated and electrically insulated by a dielectric layer or an insulation layer, for example, glass fiber, polymer, or the like. In an embodiment, a circuit board includes a medium substrate, a grounding plane, and a wiring layer, where the wiring layer and the grounding plane may be electrically connected through a via hole. In an embodiment, components such as a display, a touchscreen, an input button, a transmitter, a processor, a memory, a battery, a charging circuit, and a system on chip (system on chip, SoC) structure may be mounted on or connected to a circuit board, or electrically connected to a wiring layer and/or a grounding plane in the circuit board. For example, a radio frequency source is provided at the wiring layer.

Any one of the foregoing grounding plane, the grounding plate, or the grounding metal layer is made of a conductive material. In an embodiment, the conductive material may be any one of the following materials: copper, aluminum, stainless steel, brass and alloys thereof, copper foil on insulation laminates, aluminum foil on insulation laminates, gold foil on insulation laminates, silver-plated copper, silver-plated copper foil on insulation laminates, silver foil on insulation laminates and tin-plated copper, cloth impregnated with graphite powder, graphite-coated laminates, copper-plated laminates, brass-plated laminates and aluminum-plated laminates. A person skilled in the art may understand that the grounding plane/grounding plate/grounding metal layer may alternatively be made of other conductive materials.

Electrical length: The electrical length may be expressed by multiplying a physical length (namely, mechanical length or geometric length) by a ratio of a transmission time period of an electrical or electromagnetic signal in a medium to a time period required by this signal to travel, in free space, for a distance that is the same as the physical length of the medium, and the electrical length may satisfy the following formula:

$$\overline{L} = L \times \frac{a}{b},$$

where

L is a physical length, a is transmission time of an electrical or electromagnetic signal in a medium, and b is transmission time in free space.

Alternatively, the electrical length may be a ratio of a physical length (namely, a mechanical length or a geometric length) to a wavelength of a transmitted electromagnetic wave. The electrical length may satisfy the following formula:

$$\overline{L} = \frac{L}{\lambda},$$

where

L is a physical length, and λ is a wavelength of an electromagnetic wave.

In this embodiment of this application, a wavelength in a wavelength mode (for example, a half-wavelength mode) of an antenna may be a wavelength of a signal radiated by the antenna. For example, a half-wavelength mode of a floating metal antenna may produce a resonance including a frequency band of 1.575 GHz, where a wavelength in the half-wavelength mode may refer to a wavelength of a signal radiated by the antenna in the frequency band of 1.575 GHz. It should be understood that a wavelength of a radiation signal in the air may be calculated as follows: Air wavelength (or vacuum wavelength)=Speed of light/Frequency, where the frequency is a frequency of the radiation signal (for example, 1575 MHz), and the speed of light may be $3\times10^8$ m/s. A wavelength of the radiation signal in a medium may be calculated as follows: Medium wavelength=(Speed of light/$\sqrt{\varepsilon}$)/Frequency, where $\varepsilon$ is a dielectric constant of the medium, and the frequency is the frequency of the radiation signal. A gap and a slot in the foregoing embodiment may be filled with an insulation medium.

Limitations such as collinearity, coaxiality, coplanarity, symmetry (for example, axisymmetricity or centrosymmetry), parallelism, perpendicularity, and sameness (for example, a same length and a same width) mentioned in embodiments of this application are all for a current technology level, but are not absolutely strict definitions in a mathematical sense. A deviation of a predetermined angle (for example, ±5° or ±10°) may exist between two structures that are parallel or perpendicular to each other.

To make objectives, technical solution, and advantages of this application clearer, the following further describes the implementations of this application in detail with reference to the accompanying drawings.

The technical solutions provided in this application are applicable to an electronic device that has one or more of the following communications technologies: a Bluetooth (Bluetooth, BT) communications technology, a global positioning system (global positioning system, GPS) communications technology, a wireless fidelity (wireless fidelity, Wi-Fi) communications technology, a global system for mobile communications (global system for mobile communications, GSM) technology, a wideband code division multiple access (wideband code division multiple access, WCDMA) communications technology, a long term evolution (long term evolution, LTE) communications technology, a 5G communication technology, a SUB-6G communication technology, a millimeter wave communication technology, another future communication technology, and the like. The electronic device in embodiments of this application may be a mobile phone, a tablet computer, a notebook computer, a smart speaker, a smart household, a smart band, a smartwatch, a smart helmet, smart glasses, a drone, a wireless wearable device, an in-vehicle module, or the like. Alternatively, the electronic device may be a handheld device, computing device, another processing device connected to a wireless modem, or a vehicle-mounted device that has a wireless communication function, an electronic device in a 5G network, or an electronic device in a future evolved public land mobile network (public land mobile network, PLMN), a wireless router, customer premises equipment (Customer Premises Equipment, CPE), or the like. This is not limited in embodiments of this application. FIG. 1 shows an example of an electronic device provided in this application. An example in which the electronic device is a mobile phone is used for description.

As shown in FIG. 1, an electronic device 2 may include a cover plate 25, a display/module 241, a printed circuit board (printed circuit board, PCB board) 20A, a middle frame 26, and a rear cover 231. It should be understood that, in some embodiments, the cover plate 25 may be a glass cover plate, or may be replaced with a cover plate made of another material, for example, an ultra-thin glass material cover plate or a PET (Polyethylene terephthalate, polyethylene terephthalate) cover plate.

The cover plate 25 may be disposed close to the display/module 241, and may be mainly configured to protect the display/module 241 and prevent dust.

In an embodiment, the display/module 241 may include a liquid crystal display (liquid crystal display, LCD) panel, a light-emitting diode (light-emitting diode, LED) display panel, an organic light-emitting diode (organic light-emitting diode, OLED) display panel, and the like. This is not limited in this application.

The middle frame 26 is mainly configured to support the entire electronic device. FIG. 1 shows that the PCB board 20A is disposed between the middle frame 26 and the rear cover 231. It should be understood that, in an embodiment, the PCB board 20A may alternatively be disposed between the middle frame 26 and the display/module 241. This is not limited in this application. The printed circuit board PCB board 20A may be a flame-resistant-material (FR-4) dielectric board, or may be a Rogers (Rogers) dielectric board, or may be a hybrid dielectric board of Rogers and FR-4, or the like. Here, FR-4 is a code name of a flammable material grade, and the Rogers dielectric plate is a high-frequency board. The PCB board 20A carries an electronic element, for example, a radio frequency chip.

In an embodiment, a metal layer may be disposed on the printed circuit board PCB 20A. The metal layer may be configured to ground the electronic component carried on the printed circuit board PCB board 20A, or may be configured to ground another component, for example, a support antenna or a side frame antenna. The metal layer may be referred to as a ground plane, a grounding plate, or a grounding plane. In an embodiment, the metal layer may be formed by etching metal on a surface of any dielectric plate in the PCB board 20A. In an embodiment, the metal layer used for grounding may be disposed on a side that is of the printed circuit board PCB 20A and that is close to the middle frame 26. In an embodiment, an edge of the printed circuit board PCB 20A may be considered as an edge of the grounding plane thereof. In an embodiment, the metal middle frame 26 may also be configured to ground the foregoing components. The electronic device 2 may further have another ground plane/grounding plate/grounding plane as described above. Details are not described herein again.

The electronic device 2 may further include a battery (not shown in the figure). The battery may be disposed between the middle frame 26 and the rear cover 231, or may be disposed between the middle frame 26 and the display/module 241. This is not limited in this application. In some embodiments, the PCB board 20A is divided into a mainboard and a subboard. The battery may be disposed between the mainboard and the subboard. The mainboard may be disposed between the middle frame 26 and an upper edge of the battery, and the subboard may be disposed between the middle frame 26 and a lower edge of the battery.

The middle frame 26 may include a side frame 261. As an integrated component, the middle frame 26 including the side frame 261 may support electronic components in the entire electronic device. The cover plate 25 and the rear cover 231 respectively cover an upper edge and a lower edge of the side frame, to form a casing or a housing (housing) of the electronic device. In an embodiment, the cover plate 25, the rear cover 231, the side frame 261, and the middle frame 26 may be collectively referred to as the casing or the housing of the electronic device 2. It should be understood that the "casing or housing" may be used to refer to a part or all of any one of the cover plate 25, the rear cover 231, the side frame 261, or the middle frame 26, or refer to a part or all of any combination of the cover plate 25, the rear cover 231, the side frame 261, or the middle frame 26.

The rear cover 231 may be a rear cover made of a metal material; or may be a rear cover made of a non-conductive material, for example, a glass rear cover, a plastic rear cover, or another non-metal rear cover; or may be a rear cover made of both a conductive material and a non-conductive material.

In an embodiment, an antenna of the electronic device 2 may be further disposed in the housing, for example, a support antenna, an antenna on board formed on the PCB board 20A, or a millimeter-wave antenna module (not shown in FIG. 1). A gap may exist between the antenna disposed in the housing and another conductive member inside the housing, to ensure that an antenna radiator has a good radiation environment. In an embodiment, an aperture may be disposed near the antenna radiator. In an embodiment, the aperture may include an aperture disposed inside the electronic device 2, for example, an aperture invisible from an appearance surface of the electronic device 2. In an embodiment, the internal aperture may be formed by any one or more of the side frame, the middle frame, the battery, a circuit board, the rear cover, the display, and another internal conductive member. For example, the internal aperture may be formed by a mechanical part of the middle frame. In an embodiment, the aperture may further include a gap/slot/hole disposed on the frame 261. In an embodiment, the gap/slot/hole on the side frame 261 may be a slit formed on the side frame, and the side frame 261 is divided into two parts that are not directly connected at the slit. In an embodiment, the aperture may further include a gap/slot/hole disposed on the rear cover 231 or the display/module 241. In an embodiment, the rear cover 231 includes a conductive material, and an aperture disposed at the conductive material may be in communication with the slot or the slit of the side frame, to form a coherent aperture on the exterior surface of the electronic device 2. In an embodiment, the aperture on the rear cover 231 or the display may be further configured to place another component, for example, a camera, and/or a sensor, and/or a microphone, and/or a loudspeaker.

In an embodiment, a form of the antenna may be an antenna form based on a flexible printed circuit (Flexible Printed Circuit, FPC), an antenna form based on laser-direct-structuring (Laser-Direct-structuring, LDS), an antenna form of a microstrip antenna (Microstrip Disk Antenna, MDA), or the like. In an embodiment, the antenna may alternatively use a transparent structure embedded in a screen of the electronic device, so that the antenna is a transparent antenna element embedded in the screen of the electronic device.

FIG. 1 shows only some components included in the electronic device 2 as an example. Actual shapes, actual sizes, and actual structures of these components are not limited in FIG. 1.

It should be understood that, in this application, it may be considered that a surface on which the display of the electronic device is located is a front surface, a surface on which the rear cover is located is a rear surface, and a surface on which the side frame is located is a side surface.

It should be understood that, in this application, it is considered that, when a user holds (usually vertically and facing the screen) the electronic device, a position in which the electronic device is located includes a top, a bottom, a left, and a right.

It should be understood that, in this application, a physical length of the antenna radiator may be (1±10%) times an electrical length of the antenna radiator.

Figure 2A:
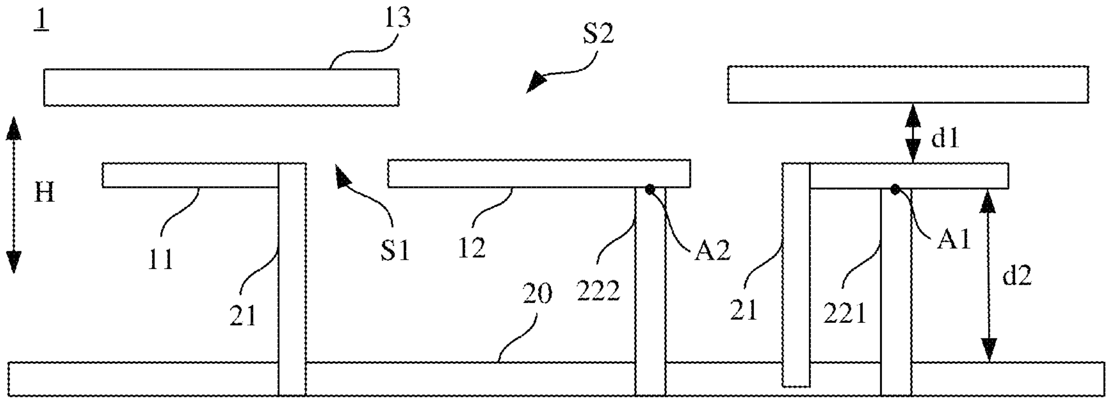
FIG. 2*a* is a sectional view of a structure of an antenna element according to an embodiment of this application.
Figure 2B:
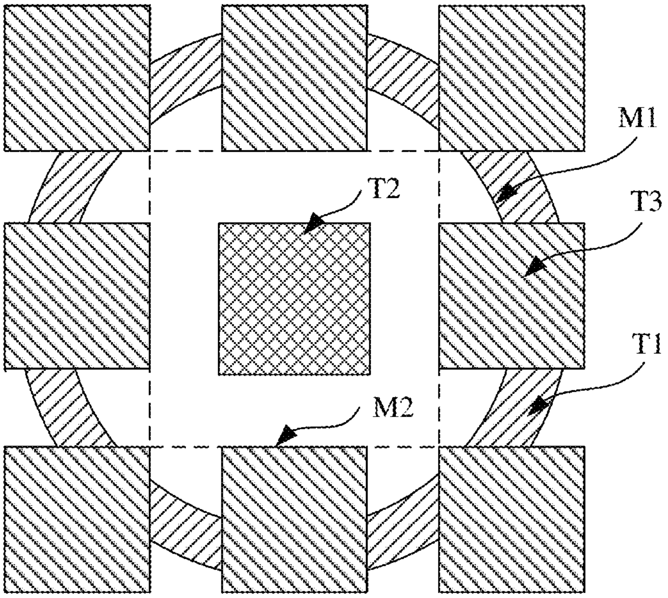
FIG. 2*b* is a diagram of projections formed by radiators of an antenna element on a projection plane according to an embodiment of this application.
Figure 2C:
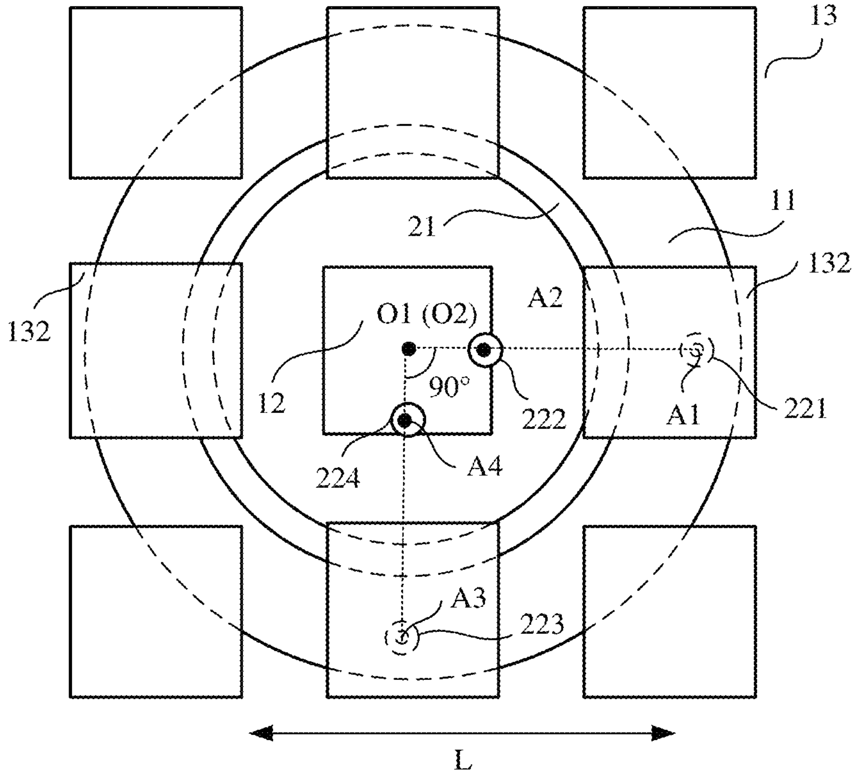
FIG. 2*c* is a top view of a structure of an antenna element according to an embodiment of this application.

Refer to FIG. 2*a* to FIG. 2*c*. FIG. 2*a* is a sectional view of a structure of an antenna element according to an embodiment of this application. FIG. 2*b* is a diagram of projections formed by radiators of the antenna element on a projection plane according to an embodiment of this application. FIG. 2*c* is a top view of a structure of the antenna element according to an embodiment of this application. This application provides an antenna element 1, including a first radiator 11 and grounding components 21. Along a height direction H of the antenna element, the first radiator 11 is spaced from a ground plane 20 and disposed opposite to the ground plane 20. In addition, the first radiator 11 is connected to the ground plane 20 through the grounding components 21.

The antenna element 1 further includes a second radiator 12. The second radiator 12 is spaced from the first radiator 11. In the height direction H of the antenna element, the second radiator 12 is spaced from the ground plane 20 and disposed opposite to the ground plane 20.

In an implementation, the second radiator 12 and the first radiator 11 are at a same height. In an implementation, the second radiator 12 is located on a side that is of the first radiator 11 and that is away from the ground plane 20. For example, the second radiator 12 and a radiator array 13 may be at a same height, or the second radiator 12 may be slightly higher than or lower than the radiator array 13. In another alternative implementation, the second radiator 12 may alternatively be located between the first radiator 11 and the ground plane 20.

In addition, a frequency ratio of two operating frequency bands of the antenna element may be adjusted based on whether the second radiator 12 is grounded, to be applicable to different operating frequency bands of the antenna element. It may also be understood as that whether the second radiator 12 is grounded may be designed as required, and the second radiator 12 may be grounded, or may not be grounded. This is not limited in this application.

The antenna element 1 further includes the radiator array 13. In the height direction H of the antenna element, the radiator array 13 is spaced from the first radiator 11 and disposed opposite to the first radiator 11, and is located on a side that is of the first radiator 11 and that is away from the ground plane 20. The radiator array 13 includes at least two sub-radiators, and the at least two sub-radiators are spaced from each other in an extension direction of a plane on which the radiator array 13 is located. In an implementation, the radiator array 13 is of an axisymmetric structure.

Refer to FIG. 2*a*. The first radiator 11 has a first hollow region S1, and the radiator array 13 has a second hollow region S2. Refer to FIG. 2*b* and understand with reference to FIG. 2*a* and FIG. 2*c*. A plane parallel to a plane on which the ground plane 20 is located is used as a projection plane. A projection of the first radiator 11 on the projection plane is a first projection T1, a projection of the second radiator 12 on the projection plane is a second projection T2, and a projection of the radiator array 13 on the projection plane is a third projection T3. The first projection T1 and the third projection T3 at least partially overlap. At least a part of the second projection T2 is located within a contour line M1 formed by the first hollow region S1 on the projection plane, and at least a part of the second projection T2 is located within a contour line M2 formed by the second hollow region S2 (as shown by a dashed line in FIG. 2*b*) on the projection plane.

That at least the part of the second projection T2 is located within the contour line M1, and at least the part of the second projection T2 is located within the contour line M2 may be understood as follows: At least the part of the second radiator 12 may radiate outward through the first hollow region S1 of the first radiator 11 and the second hollow region S2 of the radiator array 13.

That at least the part of the second projection T2 is located within the contour line M1, and at least the part of the second projection T2 is located within the contour line M2 may also be understood as follows: Viewed from a top-view direction of the antenna element, at least a part of the second radiator 12 is located in the first hollow region S1 of the first radiator 11, and at least a part of the second radiator 12 is located in the second hollow region S2 of the radiator array 13.

In an implementation, the second projection T2 is completely located within the contour line M2 formed by the second hollow region S2 on the projection plane, and the second projection T2 is completely located within the contour line M1 formed by the first hollow region S1 on the projection plane.

That the second projection T2 is completely located within the contour line M2, and the second projection T2 is completely located within the contour line M1 may also be understood as follows: Viewed from the top-view direction of the antenna element, the second radiator 12 is completely located in the second hollow region S2 of the radiator array 13, and the second radiator 12 is completely located in the first hollow region S1 of the first radiator 11.

Refer to FIG. 2*c* and understand with reference to FIG. 2*a*. The first radiator 11 is provided with a first feeding connection point A1, and the second radiator 12 is provided with a second feeding connection point A2. The first feeding connection point A1 is connected to a first feed point (not shown in the figure), and the second feeding connection point A2 is connected to a second feed point (not shown in the figure).

It should be noted that the feed point in this application may be understood as a signal output end of a radio frequency source (which may also be referred to as a feed), for example, may be an output pin of a radio frequency chip, or may be an end of a signal transmission line configured to connect to a radio frequency source. The radio frequency source does not depart from the scope of embodiments provided that the radio frequency source can be electrically connected and receive a radio frequency signal through the feed point.

A manner of connecting the first feeding connection point A1 to the first feed point and a manner of connecting the second feeding connection point A2 to the second feed point are not limited. The first feeding connection point A1 may be directly connected to the first feed point and the second feeding connection point A2 may be directly connected to the second feed point. Alternatively, the first feeding connection point A1 may be indirectly connected to the first feed point and the second feeding connection point A2 may be indirectly connected to the second feed point, for example, through feeding members. In an implementation, as shown in FIG. 2*a*, the antenna element 1 further includes a feeding member 221 and a feeding member 222. Two ends of the feeding member 221 are respectively connected to the first feeding connection point A1 and the first feed point (not shown in the figure). Two ends of the feeding member 222 are respectively connected to the second feeding connection point A2 and the second feed point (not shown in the figure). A type of the feeding member is not limited. For example, the feeding member may be a conductive member disposed in the electronic device, or may be a feed probe formed by using a metal via hole.

The antenna element in this application may be used in two operating frequency bands: a low frequency band and a high frequency band of a millimeter-wave antenna, and has a wide bandwidth in the two frequency bands. Specifically, the low frequency band may be, for example, a millimeter-wave frequency band of 24 GHz or a millimeter-wave frequency band of 28 GHz, and the high frequency band may be, for example, a millimeter-wave frequency band of 39 GHz or a millimeter-wave frequency band of 60 GHz. The first radiator 11 can provide a first resonance in which the antenna element operates in the low frequency band, and the radiator array 13 can provide a second resonance in which the antenna element operates in the low frequency band, so that the antenna element has two resonances in the low frequency band, and therefore the antenna element has a wide bandwidth in the low frequency band (for example, about 19.6% of relative bandwidth may be covered in the millimeter wave frequency band of 28 GHz). In addition, the second radiator 12 can provide a first resonance in which the antenna element operates in the high frequency band, the radiator array 13 and the first radiator 11 can provide a second resonance in which the antenna element operates in the high frequency band, so that the antenna element has two resonances in the high frequency band, and therefore the antenna element has a wide bandwidth in the high frequency band (for example, about 16.7% of relative bandwidth may be covered in the millimeter wave frequency band of 39 GHz).

From a perspective of an antenna radiation operating mode, because the antenna element in this application can enable, through the first radiator 11, the second radiator 12, and the radiator array 13, can have two operating modes: a TM10 mode and a reverse-phase TM20 mode, operating modes of the antenna element are enriched. Therefore, the antenna element in this application can greatly broaden a bandwidth of the antenna.

It can be learned that the antenna element in embodiments of this application can generate one resonance through the first radiator 11 and generate another resonance through the radiator array 13 in a low operating frequency band (for example, a millimeter wave frequency band of 24 GHz or a millimeter wave frequency band of 28 GHz). In this way, the antenna element has two resonances in the low operating frequency band, to broaden a bandwidth of the antenna element during operation in a low frequency band. In addition, the antenna element in embodiments of this application can further generate one resonance through the second radiator 12 and can generate another resonance through the first radiator 11 and the radiator array 13 in a high operating frequency band (for example, a millimeter wave frequency band of 39 GHz or a millimeter wave frequency band of 60 GHz). In this way, the antenna element has two resonances in the higher operating frequency band, to broaden a bandwidth of the antenna element during operation in a high frequency band. It can be learned that the antenna element in embodiments of this application is not only applicable to a plurality of frequency bands, but also has a wide bandwidth in each frequency band.

Therefore, when a same antenna profile (which may be understood as a height of an antenna) is used, the antenna element in this application has a higher bandwidth. It may also be understood as follows: When a same bandwidth requirement is met, the antenna element in embodiments of this application has a lower antenna profile (which may be understood as a height of an antenna). This facilitates miniaturization of the antenna and helps implement miniaturization of an electronic device.

In embodiments of this application, a shape of each radiator is not limited. For example, the first radiator 11 may be in a shape of a rectangular ring, a circular ring, or a triangular ring. The second radiator 12 may be in a shape of a circle, a rectangle, a ring, a triangle, or a polygon, or a sub-radiator 132 in the radiator array 13 may be in a shape of a circle, a rectangle, a ring, a triangle, or a polygon.

In an implementation, an operating frequency band of the antenna element during operation in a low frequency is a first operating frequency band. The first operating frequency band is 24.25 GHz to 29.5 GHZ, a center frequency of the frequency band is 26.875 GHz, and a dielectric constant of a dielectric structure (for example, a dielectric structure 201 or a dielectric structure 202 mentioned below) is 3.5. A dielectric wavelength corresponding to the first operating frequency band is $(3*10^8/\sqrt{3.5})/(26.875*10^9)=0.00597$ m=5.97 mm.

In an implementation, an operating frequency band of the antenna element during operation in a high frequency is a second operating frequency band. The second operating frequency band is 37 GHz to 43.5 GHZ, a center frequency of the frequency band is 40.25 GHZ, and a dielectric constant of a dielectric structure (for example, a dielectric structure 201 or a dielectric structure 202 mentioned below) is 3.5. A dielectric wavelength corresponding to the second operating frequency band is $(3*10^8/\sqrt{3.5})/(40.25*10^9)=0.00398$ m=3.98 mm.

Refer to FIG. 2*a*. In an implementation, a spacing between the first radiator 11 and the radiator array 13 in the height direction H of the antenna element is a spacing d1, where 0.0084 time a dielectric wavelength corresponding to the center frequency of the first operating frequency band of the antenna element≤an electrical length of the spacing d1≤0.05 time the dielectric wavelength corresponding to the center frequency of the first operating frequency band of the antenna element. In an implementation, 0.05 mm s a physical length of the spacing d1≤0.3 mm, for example, the physical length of the spacing d1 may be 0.1 mm, or may be another value in another alternative implementation.

In an implementation, in the height direction H of the antenna element, a spacing between the first radiator 11 and the ground plane 20 is a spacing d2, where 0.0168 time the dielectric wavelength corresponding to the center frequency of the first operating frequency band of the antenna element≤an electrical length of the spacing d2≤0.117 time the dielectric wavelength corresponding to the center frequency of the first operating frequency band of the antenna element. In an implementation, 0.1 mm≤a physical length of the spacing d2≤0.7 mm, for example, the physical length of the spacing d2 may be 0.2 mm, or may be another value in another implementation.

The frequency ratio of the two operating frequency bands of the antenna element may be adjusted by changing the shape of each radiator and a spacing between radiators (for example, the spacing between the first radiator 11 and the radiator array 13), to move an unnecessary operating mode out of the operating frequency band of the antenna element, so as to be applicable to different application scenarios.

A manner of forming the radiator is not limited. In an implementation, the radiator may be formed by a conductive member disposed in the electronic device. In another implementation, the radiator may alternatively be formed by a conductive layer (which may be understood as a wiring layer) in a PCB board. Specifically, the first radiator 11 includes a part of the conductive layer of the PCB board, the second radiator 12 includes a part of the conductive layer of the PCB board, the radiator array 13 includes a part of the conductive layer of the PCB board, and the ground plane 20 includes a part of a grounding plane of the PCB board. A manner of forming the grounding component 21 is not limited. For example, the grounding component 21 may be a conductive member disposed in the electronic device, or may be formed through a metal via hole.

In an implementation, the first radiator 11, the second radiator 12, and the radiator array 13 are all sheet-like radiators, and are applicable to an application scenario of a patch antenna (which may also be referred to as a patch antenna).

In an implementation, when the antenna element 1 is in the first operating frequency band, the first operating frequency band may be, for example, the millimeter wave frequency band of 28 GHz, that is, in a frequency range from 24.25 GHz to 29.5 GHZ. The first radiator 11 can be excited to generate the first resonance, and a resonance frequency of the first resonance may be, for example, 25.25 GHz. The radiator array 13 can be excited to generate the second resonance, and a resonance frequency of the second resonance may be, for example, 28 GHz. When the antenna element is in the second operating frequency band, the second operating frequency band may be, for example, the millimeter wave frequency band of 39 GHz, that is, in a frequency range from 37 GHz to 43.5 GHz. The second radiator 12 can be excited to generate a third resonance, and a resonance frequency of the third resonance may be, for example, 38.25 GHz. The first radiator 11 and the radiator array 13 can be excited to generate a fourth resonance, and a resonance frequency of the fourth resonance may be, for example, 41.5 GHz.

Figure 3:
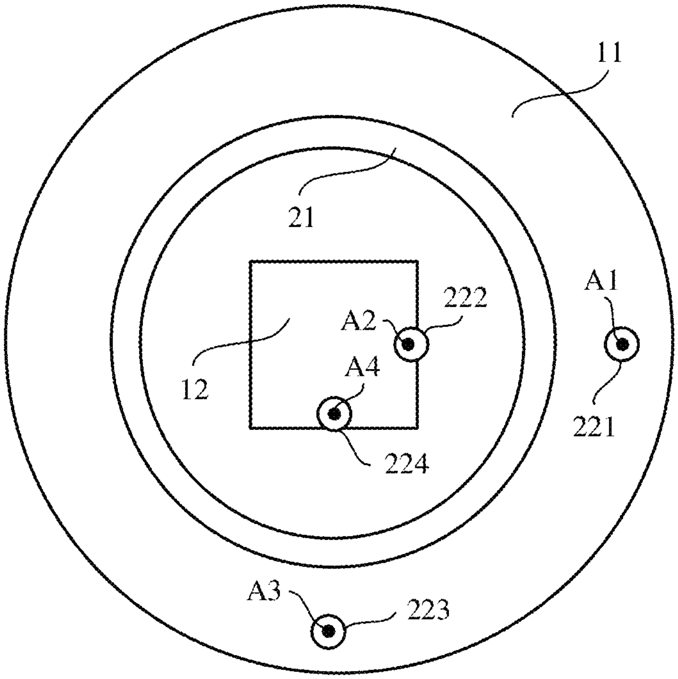
FIG. 3 is a top view of structures of a first radiator and a second radiator in an antenna element according to an embodiment of this application.

In an implementation, refer to FIG. 2*a* to FIG. 3. FIG. 3 is a top view of structures of the first radiator and the second radiator in the antenna element according to an embodiment of this application. The first radiator 11 is further provided with a third feeding connection point A3, and the third feeding connection point A3 is connected to a third feed point (not shown in the figure). The second radiator 12 is further provided with a fourth feeding connection point A4. The fourth feeding connection point A4 is connected to a fourth feed point (not shown in the figure). In an implementation, the third feeding connection point A3 is connected to the third feed point (not shown in the figure) through a feeding component 223. The fourth feeding connection point A4 is connected to the fourth feed point (not shown in the figure) through a feeding component 224. In another implementation, alternatively, the third feeding connection point A3 and the fourth feeding connection point A4 may be directly connected to corresponding feed points.

As shown in FIG. 2*c*, an included angle between a connection line from the first feeding connection point A1 to a center point O1 of the first radiator 11 and a connection line from the third feeding connection point A3 to the center point O1 of the first radiator 11 is 90°. It may also be understood as that an angle difference between the first feeding connection point A1 and the third feeding connection point A3 in a circumferential direction of the first radiator 11 is 90°.

An included angle between a connection line from the second feeding connection point A2 to a center point O2 of the second radiator 12 (in FIG. 2*c*, the center point O1 coincides with the center point O2) and a connection line from the fourth feeding connection point A4 to the center point O2 of the second radiator 12 (in FIG. 2*c*, the center point O1 coincides with the center point O2) is 90°. It may also be understood as that an angle difference between the second feeding connection point A2 and the fourth feeding connection point A4 in a circumferential direction of the second radiator 12 is 90°.

In an implementation, the first radiator 11 is in the shape of the circular ring. Therefore, the center point of the first radiator 11 is located in a circle center of the circular ring. In another implementation, when the first radiator 11 and the second radiator 12 are in another shape, the center point O1 of the first radiator 11 may alternatively be located at another position, and the center point O2 of the second radiator 12 may alternatively be located at another position in an extension direction of a plane on which the radiator is located. It may also be understood as: Viewed from a perspective shown in FIG. 2*c*, the center point O1 of the first radiator 11 and the center point O2 of the second radiator 12 may alternatively not coincide.

In addition, a position relationship between the first feeding connection point A1 and the second feeding connection point A2 is not limited. In an implementation, the connection line from the first feeding connection point A1 to the center point O1 of the first radiator 11 and the connection line from the second feeding connection point A2 to the center point O2 of the second radiator 12 may be parallel. It may be also understood as follows: As shown in FIG. 2*c*, in a length direction L of the radiator, the first feeding connection point A1 and the second feeding connection point A2 are disposed in alignment. In another implementation, the connection line from the first feeding connection point A1 to the center point O1 of the first radiator 11 and the connection line from the second feeding connection point A2 to the center point O2 of the second radiator 12 may not be parallel. For example, as shown in FIG. 2*c*, in a length direction L of the radiator, the first feeding connection point A1 and the second feeding connection point A2 may be disposed in a staggered manner.

Similarly, a position relationship between the third feeding connection point A3 and the fourth feeding connection point A4 is not limited. Along the length direction L of the radiator, the third feeding connection point A3 and the fourth feeding connection point A4 may be disposed in alignment, or may be disposed in a staggered manner.

According to the antenna element in embodiments of this application, two feeding connection points (the first feeding connection point A1 and the third feeding connection point A3) are disposed on the first radiator 11, and an angle difference between the two feeding connection points (the first feeding connection point A1 and the third feeding connection point A3) in the circumferential direction of the first radiator 11 is 90°. Two feeding connection points (the second feeding connection point A2 and the fourth feeding connection point A4) are disposed on the second radiator 12, and an angle difference between the two feeding connection points (the second feeding connection point A2 and the fourth feeding connection point A4) in the circumferential direction of the second radiator 12 is 90°. Therefore, dual polarization can be implemented when the antenna element operates in both the low frequency band and the high frequency band, to improve a signal-to-noise ratio of the antenna element and increase a channel capacity.

In an implementation, refer to FIG. 2*c* and understood with reference to FIG. 2*a*. The first radiator 11 is in a shape of a ring, and the first radiator 11 is of an axisymmetric structure. The grounding component 21 is in a ring-shaped columnar structure, one end of the grounding component 21 is connected to an inner edge of the first radiator 11, and the other end of the grounding component 21 is connected to the ground plane 20.

Figure 4:
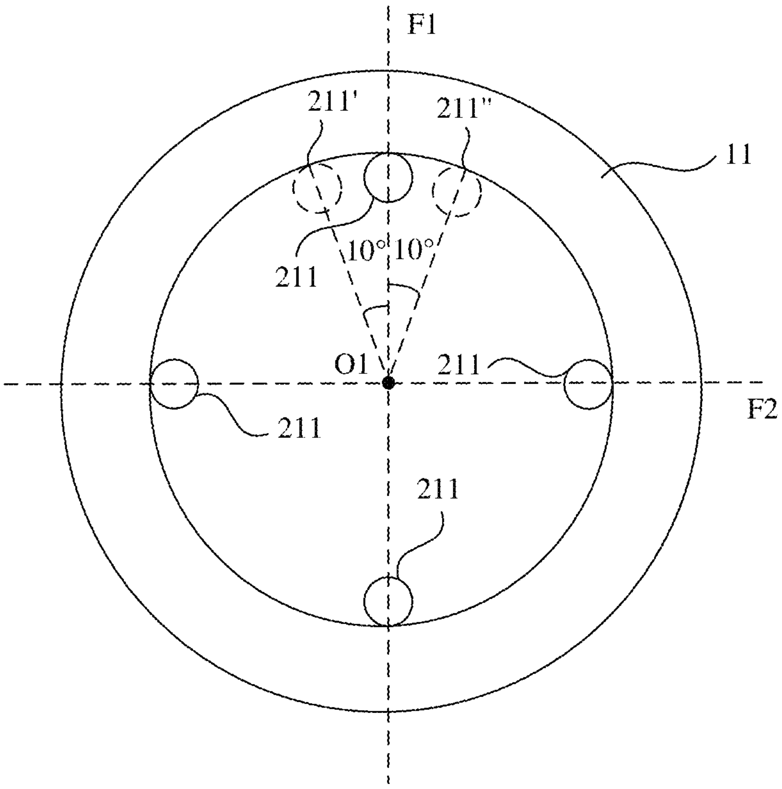
FIG. 4 is a top view of structures of a first radiator and a grounding post in an antenna element according to an embodiment of this application.

In another alternative implementation, refer to FIG. 4 and understand with reference to FIG. 2*a*. FIG. 4 is a top view diagram of structures of the first radiator and the grounding post in the antenna element according to an embodiment of this application.

The grounding component 21 includes a plurality of grounding posts 211 spaced in a circumferential direction of an inner edge of the first radiator 11. A first end of each of the plurality of grounding posts 211 is connected to the inner edge of the first radiator 11, and a second end of each grounding post 211 is connected to the ground plane 20.

In an implementation, the plurality of grounding posts 211 include a plurality of grounding post pairs, and two grounding posts in each grounding post pair are symmetrical with respect to the center point O1 of the first radiator 11. A person skilled in the art may understand that symmetry is not strict symmetry in a mathematical sense, and may have an angle offset. For example, from a top-view prospective shown in FIG. 4, a grounding post 211 located right below the center point O1 and a grounding post 211 located right above the center point O1 are a grounding post pair. The two grounding posts may be strictly symmetrical with respect to the center point O1, or may have an angle offset relative to the center point O1. For example, the offset is 10° (as shown in FIG. 4, the grounding post 211 located right above the center point O1 may be offset to a position of a grounding post 211' or a position of a grounding post 211" shown by the dashed line).

In an implementation, the first radiator 11 has a first axis of symmetry F1 and a second axis of symmetry F2 that are perpendicular to each other. The plurality of grounding posts 211 are symmetrical with respect to the first axis of symmetry F1 of the first radiator 11 and/or the second axis of symmetry F2 of the first radiator 11. Specifically, that the plurality of grounding posts 211 are symmetrical with respect to the first axis of symmetry F1 of the first radiator 11 and/or the second axis of symmetry F2 of the first radiator 11 may be understood as follows: If there are two grounding posts 211, the two grounding posts 211 may be symmetrical with respect to the first axis of symmetry F1, or may be symmetrical with respect to the second axis of symmetry F2, or if there are more than two grounding posts 211, the plurality of grounding posts 211 are symmetrical with respect to the first axis of symmetry F1, and are symmetrical with respect to the second axis of symmetry F2.

In an implementation, the plurality of grounding posts 211 are evenly spaced in a circumferential direction of an inner edge of the first radiator 11.

A quantity of grounding posts 211 is not limited, for example, may be 4, 6, or 8. The quantity does not depart from the scope of embodiments of this application provided that the plurality of grounding posts 211 are symmetrical with respect to the first axis of symmetry F1 and/or the second axis of symmetry F2 of the first radiator 11. A shape of a cross section of the grounding post 211 is not limited, for example, may be a circle, a rectangle, or a polygon.

In an implementation, refer to FIG. 2*a* and FIG. 2*c* for understanding. The first radiator 11, the second radiator 12, and the radiator array 13 are all symmetrical with respect to the first axis of symmetry F1 and the second axis of symmetry F2. In addition, a central axis of the first radiator 11, a central axis of the second radiator, and a central axis of the radiator array coincide. The central axis of the first radiator 11 is an axis on which a circle center of the first radiator 11 is located.

In embodiments of this application, a quantity of sub-radiators in the radiator array 13 is not limited, for example, may be 2, 4, 6, or 8. In an implementation, there are two sub-radiators. The two sub-radiators are distributed on two sides of the second radiator in a first direction. A spacing between the two sub-radiators in the first direction is used as the second hollow region. The first feeding connection point and the second feeding connection point are distributed in the first direction. The first direction is parallel to a plane on which the second radiator is located. In an implementation, the first direction may be, for example, parallel to the length direction L of the radiator shown in FIG. 2*c*. Further, the two sub-radiators may be, for example, two sub-radiators located on a left side and a right side of the second radiator 12 in FIG. 2*c*. In another implementation, the first direction may alternatively be another direction.

In an implementation, the radiator array is in a ring shape. The radiator array includes N sub-radiator groups. Each sub-radiator group includes a plurality of sub-radiators. In the extension direction of the plane on which the radiator array is located, the plurality of sub-radiators in each sub-radiator group are spaced from each other and are adjacent to each other from head to tail to form a ring structure. N is greater than or equal to 1.

Figure 5A:
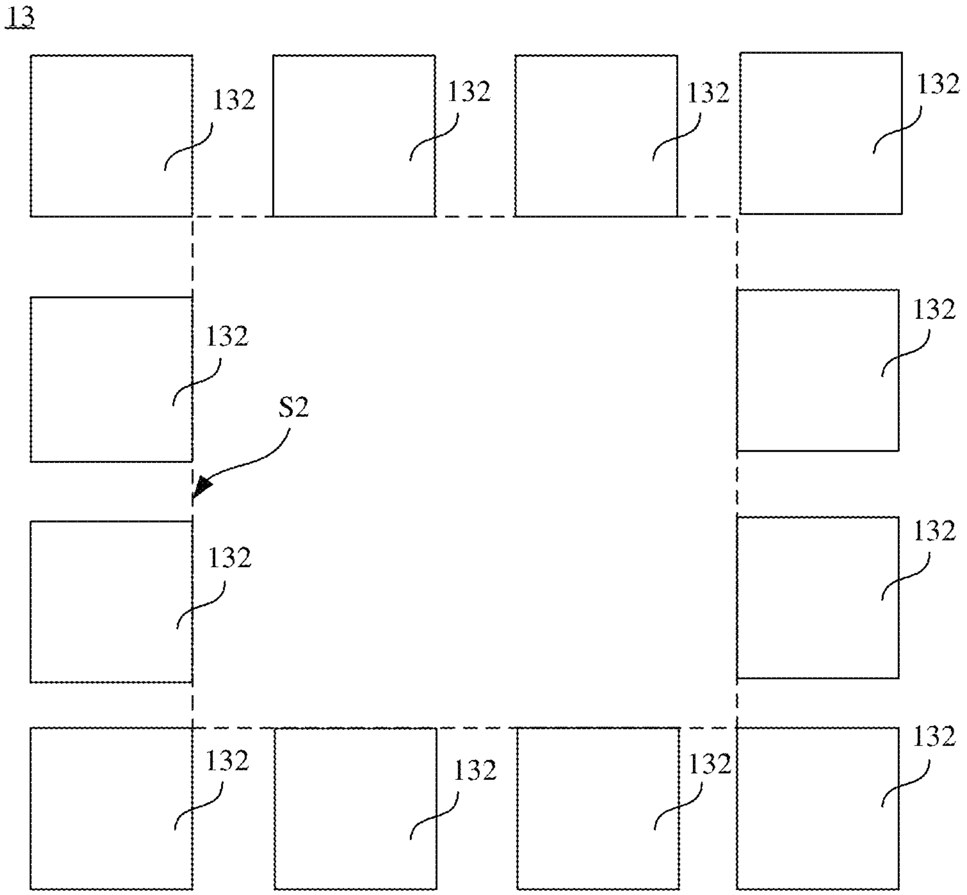
FIG. 5*a* is a top view of a structure of a radiator array in an antenna element according to an embodiment of this application.

In an implementation, N is equal to 1. FIG. 5*a* is a top view of a structure of the radiator array in the antenna element according to an embodiment of this application. There are 12 sub-radiators 132. The 12 sub-radiators 132 are spaced from each other and are adjacent to each other from head to tail to form a rectangular ring. An interior of the rectangular ring is used as the second hollow region S2 of the radiator array 13. The radiator array 13 with the foregoing structure may also be understood as a 4×4 one-circle ring array structure.

In an implementation, N is greater than or equal to 2. N ring structures formed by the N sub-radiator groups are concentrically disposed on a same plane, and form a multi-layer ring structure. Inner space enclosed by an innermost ring structure in the N ring structures is used as the second hollow region.

Figure 5B:
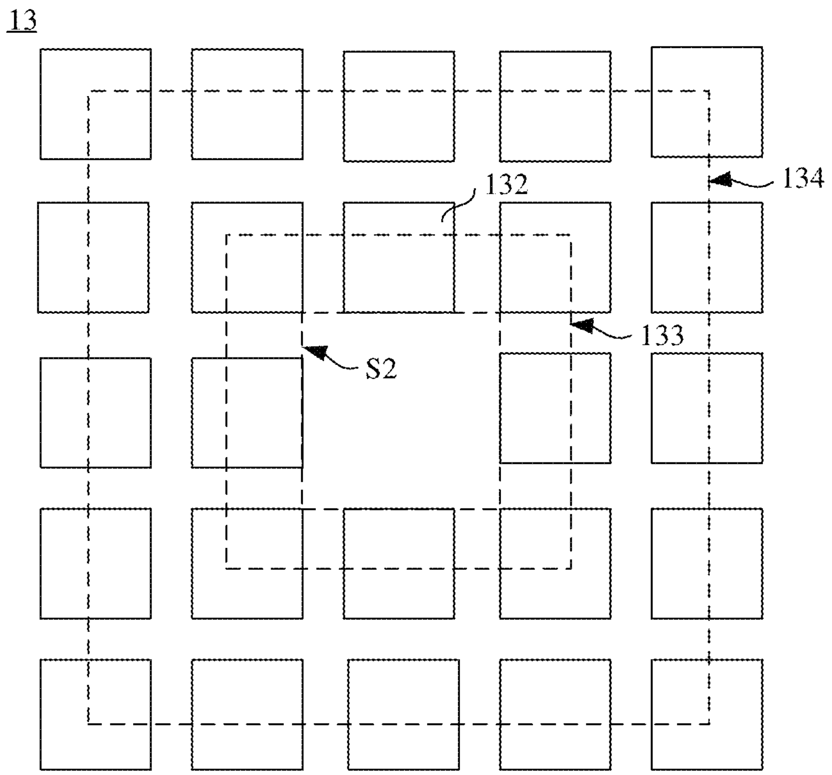
FIG. 5*b* is a top view of a structure of a radiator array in an antenna element according to an embodiment of this application, where the radiator array includes two sub-radiator groups.

In an implementation, N is equal to 2. FIG. 5*b* is a top view of the structure of the radiator array in the antenna element according to an embodiment of this application. Eight sub-radiators 132 in an inner circle are spaced from each other and are adjacent to each other from head to tail to form a rectangular ring 133, the rectangular ring 133 is used as one sub-radiator group of the radiator array 13, 16 sub-radiators 132 of an outer circle are spaced from each other and adjacent to each other from head to tail to form a rectangular ring 134, and the rectangular ring 134 is used as another sub-radiator group of the radiator array 13. The radiator array 13 with the foregoing structure may also be understood as a 3×3 two-circle ring array structure.

A person skilled in the art may understand that, in another alternative implementation, a quantity of sub-radiators in each sub-radiator group may alternatively be another quantity, and the quantity N of sub-radiator groups may alternatively be another quantity.

This application further provides an electronic device, including the antenna element 1 in the foregoing implementations.

Because the antenna element in embodiments of this application has a lower antenna profile (which may be understood as a height of an antenna) when a same bandwidth requirement is met, the antenna element in embodiments of this application occupies small space in the electronic device. This helps implement miniaturization of the electronic device.

Figure 6:
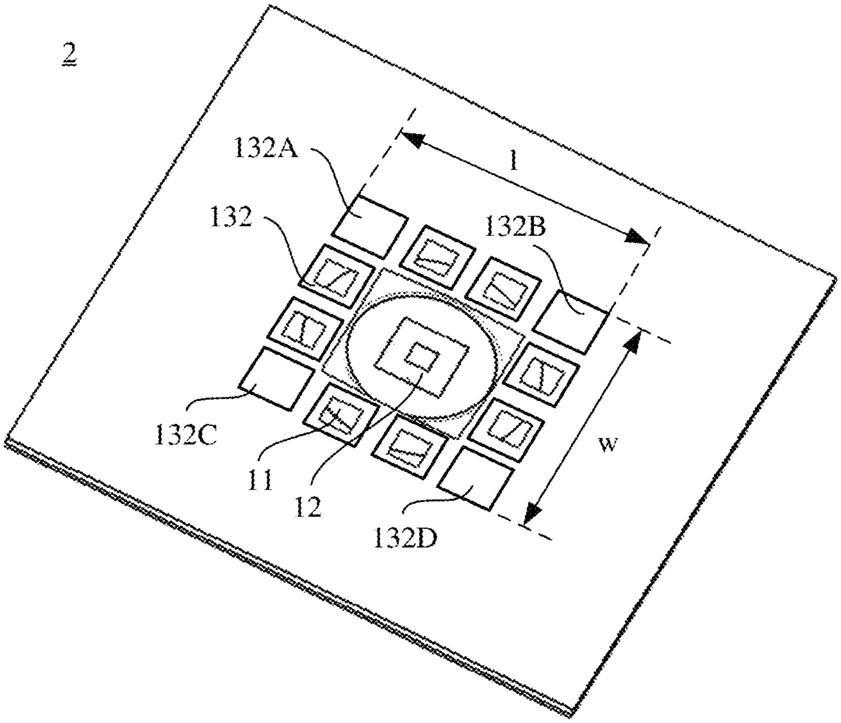
FIG. 6 is a diagram of a three-dimensional structure of an antenna element in an electronic device according to an embodiment of this application, where some sub-radiators in a radiator array are ring-shaped.
Figure 7:
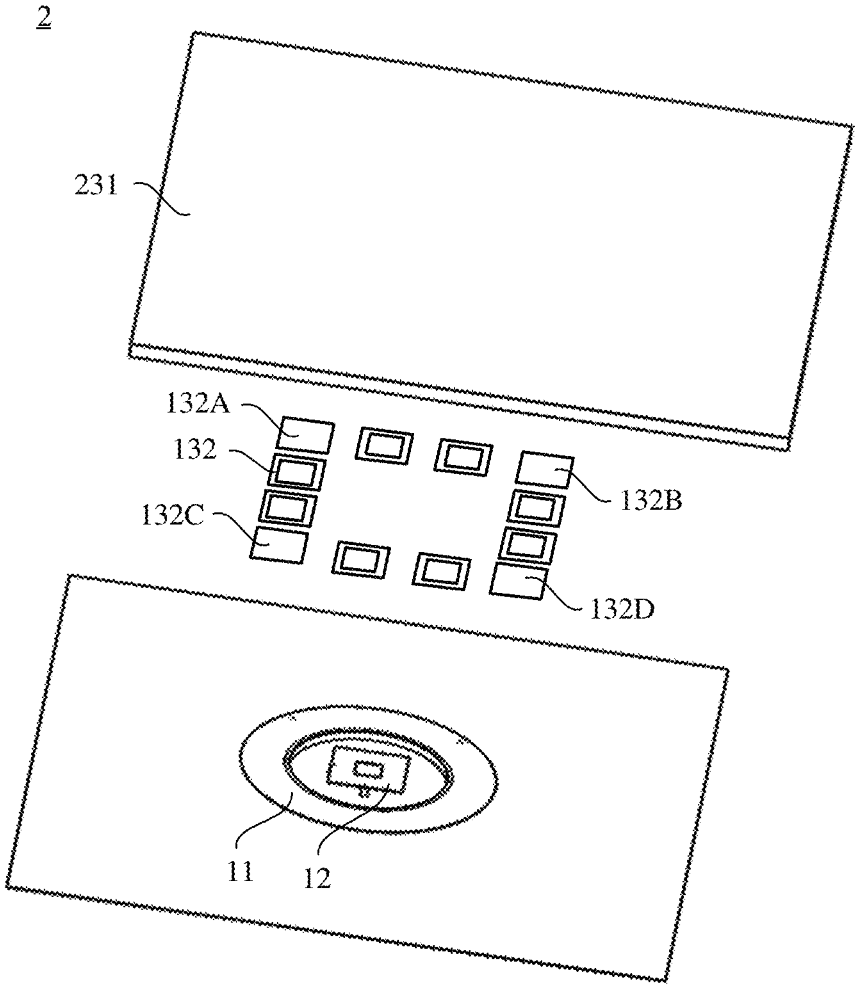
FIG. 7 is an exploded view of a partial three-dimensional structure of an electronic device according to an embodiment of this application.

In an implementation, to meet a requirement of using the antenna element 1 in the electronic device, and enable the frequency ratio of the two operating frequency bands of the antenna element to be applicable to a specific application scenario, refer to FIG. 6 and FIG. 7. FIG. 6 is a diagram of a three-dimensional structure of the antenna element in the electronic device according to an embodiment of this application. FIG. 7 is an exploded view of a partial three-dimensional structure of the electronic device according to an embodiment of this application. The antenna element 1 is disposed below a rear cover 231 of an electronic device 2, and sub-radiators (for example, a sub-radiator 132A, a sub-radiator 132B, a sub-radiator 132C, and a sub-radiator 132D) located at four corners of a rectangular ring in a radiator array 13 are in a rectangular shape, remaining radiators are in a ring shape, and a second radiator 12 is in a rectangular ring shape. In another implementation, a shape of each radiator may also be another shape.

Figure 8:
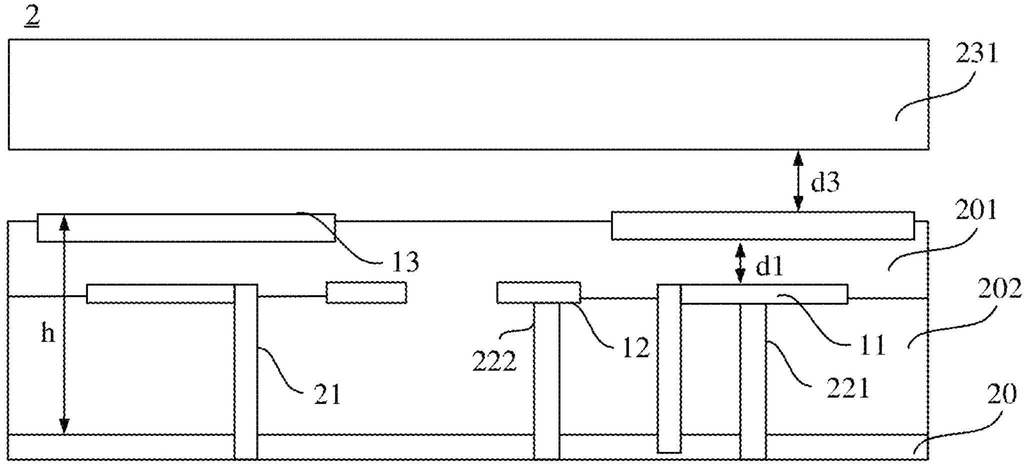
FIG. 8 is a sectional view of a partial structure of an electronic device according to an embodiment of this application.

In an implementation, FIG. 8 is a sectional view of a partial structure of the electronic device according to an embodiment of this application. The electronic device 2 further includes dielectric structures (for example, a dielectric structure 201 and a dielectric structure 202). The first radiator 11, the second radiator 12, and the radiator array 13 are all disposed in the dielectric structures (for example, the dielectric structure 201 and the dielectric structure 202). The dielectric structure 201 and the dielectric structure 202 may be a same dielectric structure, or may be different dielectric structures. Further, the dielectric structure 201 and the dielectric structure 202 may be made of a same material or different materials. This is not limited in this application.

In an implementation, the dielectric structure 201 and the dielectric structure 202 are formed by dielectric substrates located at different layers of a PCB board, and the ground plane 20 is formed by a grounding plane of the PCB board. Both the first radiator 11 and the second radiator 12 are disposed in the dielectric structure 202, the radiator array 13 is disposed in the dielectric structure 201, and the first radiator 11, the second radiator 12, and the radiator array 13 are all formed by a conductive layer (which may be understood as a wiring layer) in the PCB board.

Figure 9:
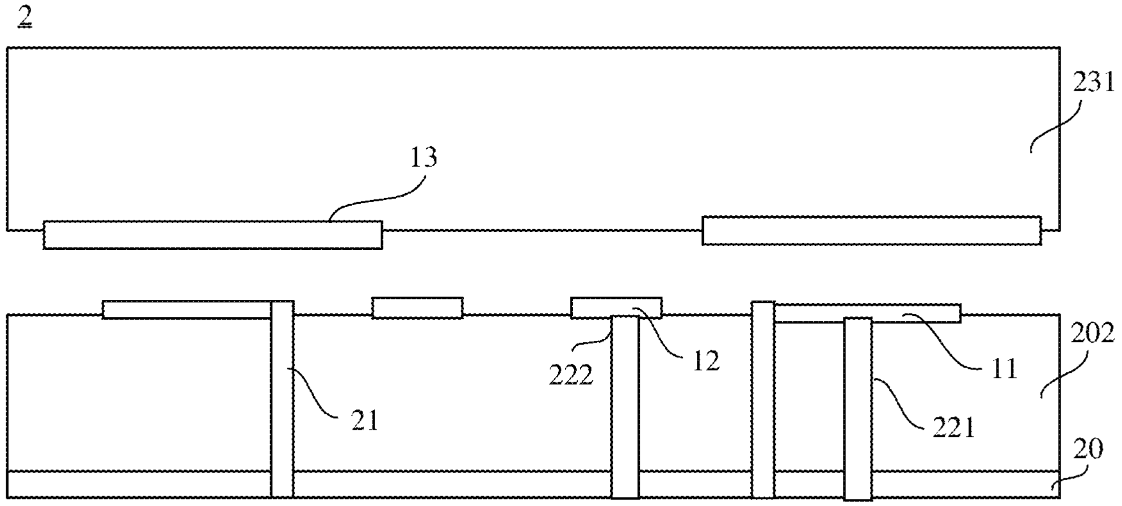
FIG. 9 is a sectional view of a partial structure of an electronic device according to an embodiment of this application, where a radiator array is attached to a surface that is of a rear cover and that faces an interior of the electronic device.

In an implementation, FIG. 9 is a sectional view of a partial structure of the electronic device according to an embodiment of this application. The electronic device 2 further includes the rear cover 231 and the dielectric structure 202. The radiator array 13 is attached to a surface that is of the rear cover 231 and that faces the inside of the electronic device. For example, the radiator array 13 may be directly printed on a surface that is of the rear cover 231 and that faces the ground plane 20, and the first radiator 11 and the second radiator 12 are disposed in the dielectric structure 202. The radiator array 13 is attached to the rear cover 231, so that space at a lower part the rear cover 231 of the electronic device can be used to a maximum extent. This helps further reduce space occupied by the antenna element 1 in the electronic device, and further implements miniaturization of the electronic device.

Figure 10:
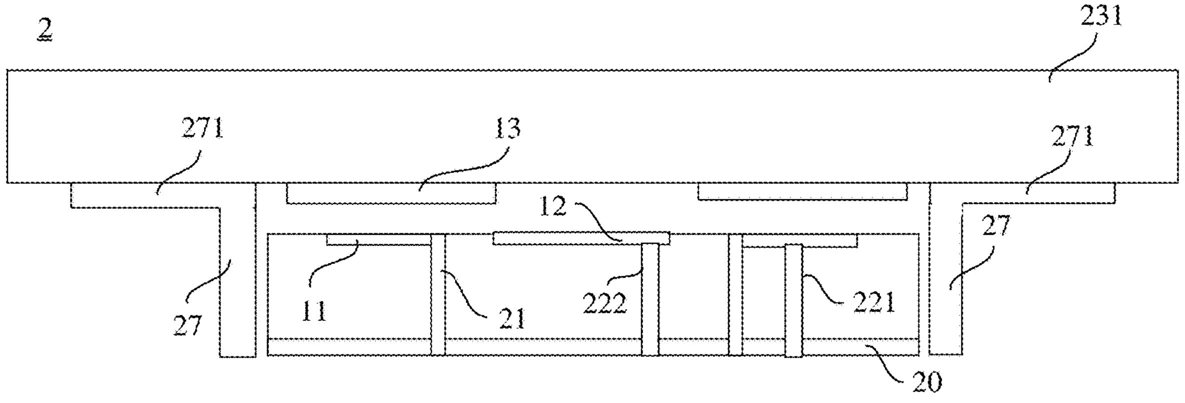
FIG. 10 and FIG. 11 are both sectional views of structures of an antenna element and a metal fence structure in an electronic device according to an embodiment of this application.

In embodiments of this application, when the antenna element is applied to a millimeter-wave antenna, and the millimeter-wave antenna is disposed at the lower part of the rear cover of the electronic device, the antenna element excites a surface wave on the rear cover when operating, to affect performance of the antenna element. In an implementation, refer to FIG. 10. The electronic device 2 further includes the rear cover 231 and a metal fence structure 27. The rear cover 231 is disposed opposite to the antenna element 1, and the metal fence structure 27 presses against the rear cover 231 and the ground plane 20. The antenna element 1 is enclosed in space formed by the metal fence structure 27, the rear cover 231, and the ground plane 20, and the surface wave can be effectively suppressed by disposing the metal fence structure 27.

The metal fence structure 27 may be, for example, a conductive member disposed in the electronic device 2, and a shape of the metal fence structure 27 is not limited. For example, the metal fence structure 27 may be a rectangular ring-shaped column disposed around an outer circumference of the antenna element 1, or a circular ring-shaped column. In an implementation, one end that is of the metal fence structure 27 and that is close to the rear cover 231 has a protruding part 271 extending along a surface of the rear cover 231, and the protruding part 271 can increase a contact area between the metal fence structure 27 and the rear cover 231. Therefore, stability and firmness of contact between the metal fence structure 27 and the rear cover 231 can be enhanced.

Figure 11:
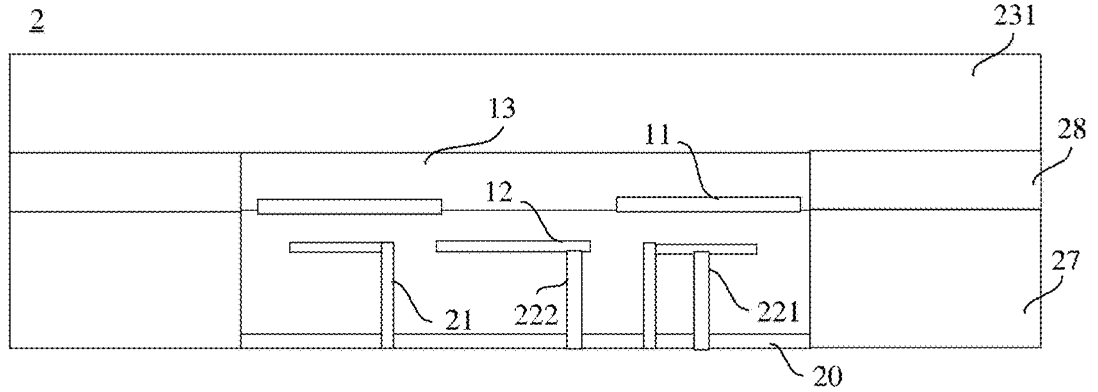

In an implementation, to facilitate installation of the metal fence structure 27, refer to FIG. 11. The electronic device 2 further includes metal foam 28, and the metal foam 28 presses against the metal fence structure 27 and the rear cover 231. Because the metal foam 28 is elastic to some extent and can be compressed, a spacing between the metal fence structure 27 and the rear cover 231 can be better filled, to be applicable to different terminal IDs (industrial design, industrial design).

Figure 12:
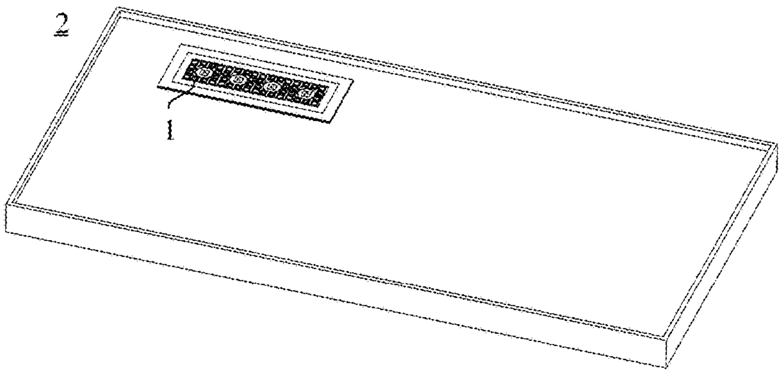
FIG. 12 is a diagram of a partial three-dimensional structure of an electronic device according to an embodiment of this application, where a plurality of antenna elements are distributed in an array form in the electronic device.
Figure 13:
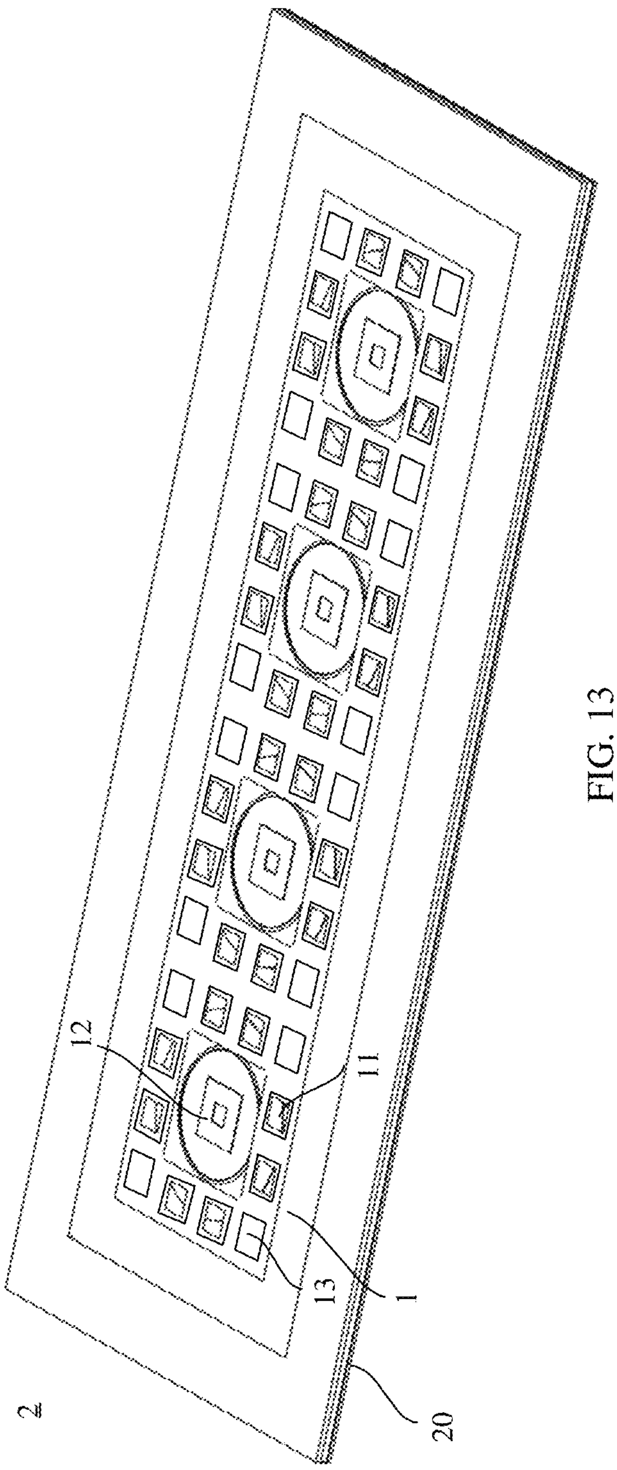
FIG. 13 is an enlarged drawing of a partial three-dimensional structure of an antenna element in an electronic device according to an embodiment of this application.

In an implementation, refer to FIG. 12 and FIG. 13. FIG. 12 is a diagram of a partial three-dimensional structure of the electronic device according to an embodiment of this application. FIG. 13 is an enlarged drawing of a partial three-dimensional structure of an antenna element in an electronic device according to an embodiment of this application. The electronic device 2 includes a plurality of antenna elements 1, and the plurality of antenna elements 1 are distributed in an array form in the electronic device 2. In an implementation, a metal fence structure is disposed on an outer circumference of the plurality of antenna elements 1. It may also be understood as follows: The plurality of antenna elements share one metal fence structure to suppress a surface wave generated on the rear cover of the electronic device when the antenna element is excited. In another alternative implementation, an independent metal fence structure is disposed on an outer circumference of each antenna element in the plurality of antenna elements 1.

Figure 14:
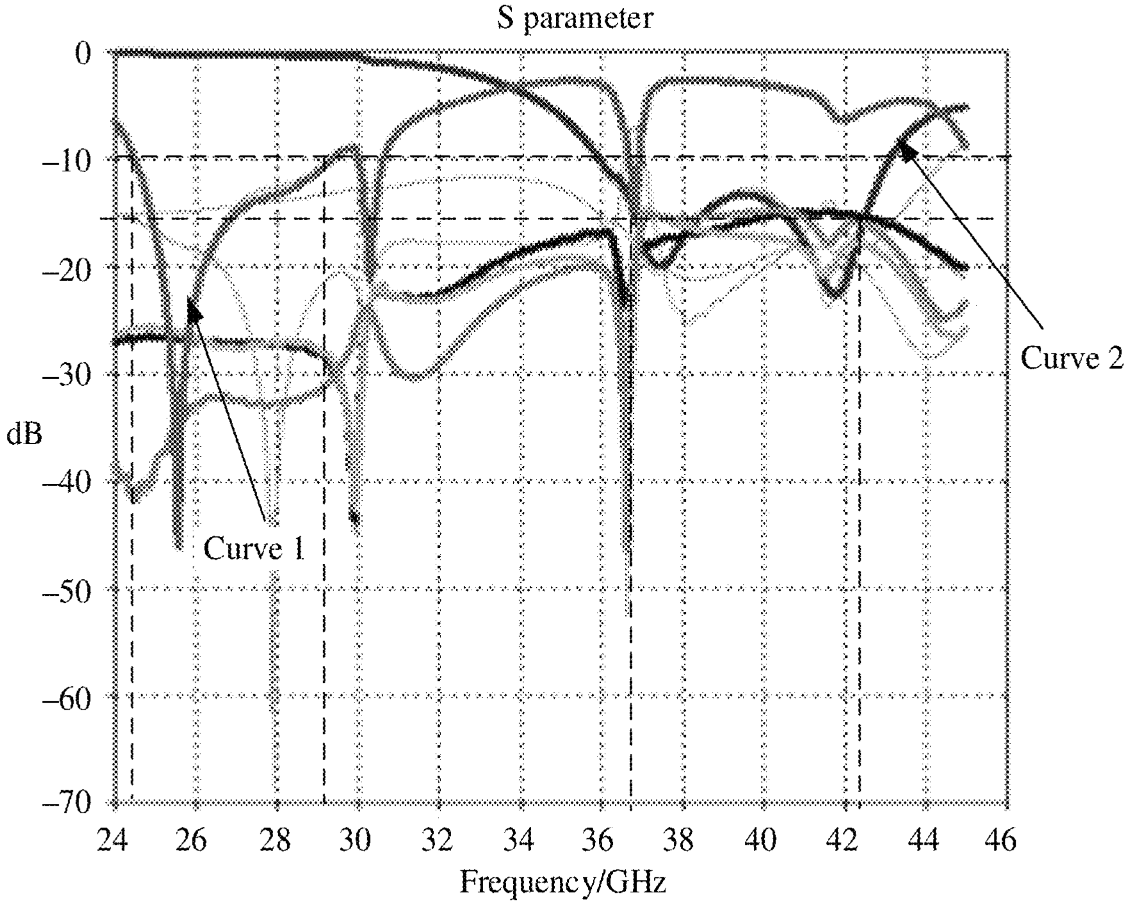
FIG. 14 is a curve diagram of an S11 parameter effect obtained by performing simulation effect analysis on an antenna element according to an embodiment of this application.
Figure 15:
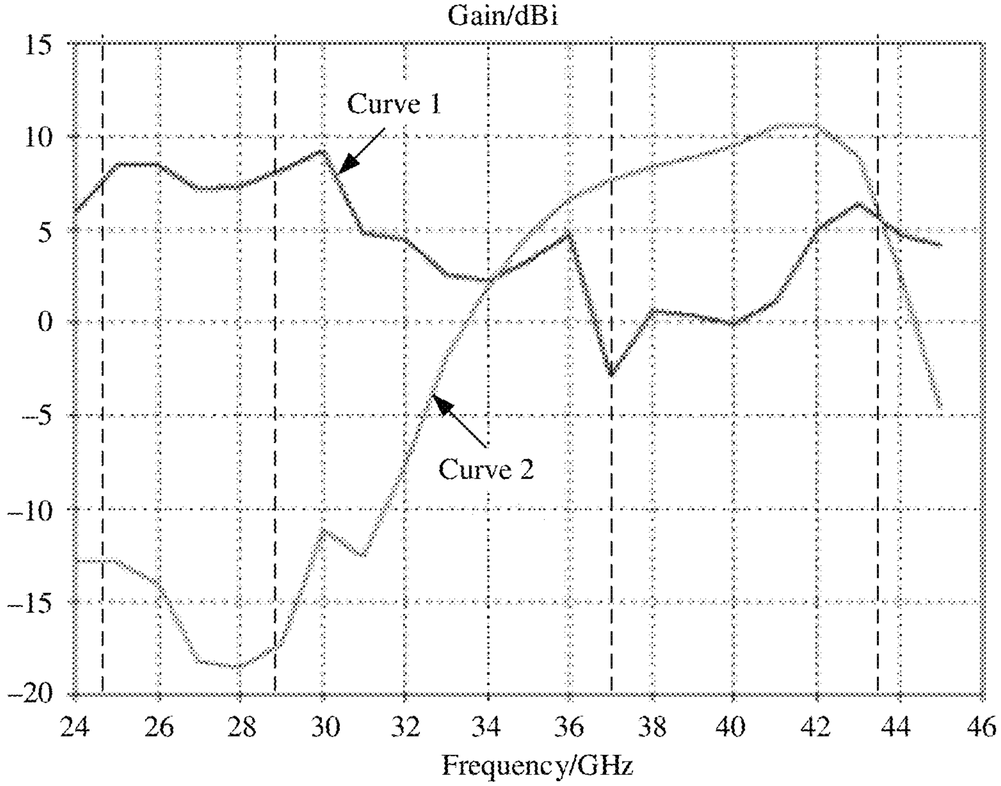
FIG. 15 is a curve diagram of a gain effect obtained by performing simulation effect analysis on an antenna element according to an embodiment of this application.

A simulation analysis is performed on the antenna element in the electronic device provided in this embodiment by using simulation software, and simulation effect diagrams shown in FIG. 14 and FIG. 15 are obtained.

Simulation data for obtaining the simulation effect diagrams shown in FIG. 14 and FIG. 15 is shown in the following Table 1 (understand with reference to FIG. 6 and FIG. 8).

TABLE 1

| Parameter | Simulation data |
|---|---|
| Thickness (mm) of the rear cover 231 | 0.6 |
| Dielectric constant of the rear cover 231 | 6 |
| Spacing d3 (mm) between a radiator array 13 and the rear cover 231 | 0.1 |

TABLE 1-continued

| Parameter | Simulation data |
|---|---|
| Spacing d1 (mm) between the radiator array 13 and a first radiator 11 | 0.1 |
| Length l (mm) of the antenna element 1 | 5.75 |
| Width w (mm) of the antenna element 1 | 5.75 |
| Height h (mm) of the antenna element 1 | 0.3 |

It should be noted that the foregoing is merely an example of antenna parameter selection. When the antenna element in embodiments of this application is applicable to another operating frequency band, parameter selection and adjustment may be performed based on an actual application scenario. This is not limited in this application.

In FIG. 14, a horizontal coordinate represents a frequency in a unit of GHz, a vertical coordinate represents an amplitude value of S11 in a unit of dB, and S11 belongs to one of S parameters. S11 represents a reflection coefficient, and this parameter can represent advantages and disadvantages of transmit efficiency of an antenna. Specifically, a smaller value of S11 indicates a smaller return loss of the antenna, and less energy reflected by the antenna, that is, more energy actually enters the antenna. It should be noted that, in engineering, a value −6 dB of S11 is generally used as a standard. When the value of S11 of the antenna is less than −6 dB, it may be considered that the antenna can operate normally, or it may be considered that the transmit efficiency of the antenna is good. In FIG. 15, a horizontal coordinate represents a frequency in a unit of GHz, and a vertical coordinate represents a gain of the antenna in a unit of dBi. The gain of the antenna may be understood as a ratio of radiated power flux density of the antenna in a specified direction to maximum radiated power flux density of a reference antenna at same input power. The antenna gain can quantitatively represent a degree to which the antenna radiates input power in a centralized manner, and may be used to measure a capability of the antenna to transmit or receive a signal in the specific direction.

In FIG. 14, a curve 1 is an S11 curve obtained when an antenna element excites the first feed point and the antenna element operates in the low frequency band according to an embodiment of this application. A curve 2 is an S11 curve obtained when the antenna element excites the second feed point and the antenna element operates in the high frequency band according to an embodiment of this application.

It should be noted that, in embodiments of this application, because all the radiators are of axisymmetric structures, the antenna element excites the third feed point, the S11 curve obtained when the antenna element operates in the low frequency band is basically consistent with or coincide with the curve 1, the antenna element excites the fourth feed point, and the S11 curve obtained when the antenna element operates in the high frequency band is basically consistent with or coincides with the curve 2.

It can be learned from FIG. 14 that the value of S11 is −10 dB is used as a standard, and the antenna element in embodiments of this application can cover a frequency band of 24.25 GHz to 29.5 GHz and a frequency band of 37 GHz to 43.5 GHZ.

In FIG. 15, a curve 1 is a gain curve obtained when the antenna element operates in the low frequency band according to an embodiment of this application. A curve 2 is a gain curve obtained when the antenna element operates in the high frequency band according to an embodiment of this application.

It can be learned from FIG. 14 that, in the low frequency band of 24.25 GHz to 29.5 GHz and the high frequency band of 37 GHz to 43.5 GHZ, a gain of the antenna element in embodiments of this application is approximately 6.7 dBi to 10.6 dBi.

It can be learned that the antenna element in embodiments of this application can cover the frequency bands of 24.25 GHz to 29.5 GHz and 37 GHz to 43.5 GHZ, and the gain in the two frequency bands is approximately 6.7 dBi to 10.6 dBi. It can be learned that the antenna element in embodiments of this application can be applied to the plurality of frequency bands, and has the wide bandwidth in each frequency band.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

The invention claimed is:

1. An antenna element, comprising:

a first radiator and a grounding component, wherein in a height direction of the antenna element, the first radiator is spaced from a ground plane and disposed opposite to the ground plane, and the first radiator is connected to the ground plane through the grounding component;

a second radiator, wherein the second radiator is spaced from the first radiator, and, in the height direction of the antenna element, the second radiator is spaced from the ground plane and disposed opposite to the ground plane; and a radiator array, wherein, in the height direction of the antenna element, the radiator array is spaced from the first radiator and disposed opposite to the first radiator, and the radiator array is located on a first side that is of the first radiator and that is further from the ground plane than a second side of the first radiator that is closest to the ground plane; and the radiator array comprises at least two sub-radiators, and the at least two sub-radiators are spaced from each other in an extension direction of a plane on which the radiator array is located, wherein the first radiator comprises a first hollow region, and the radiator array comprises a second hollow region;

a first plane parallel to a second plane on which the ground plane is located is used as a projection plane, a projection of the first radiator on the projection plane is a first projection, a projection of the second radiator on the projection plane is a second projection, and a projection of the radiator array on the projection plane is a third projection; and the first projection and the third projection at least partially overlap, at least a part of the second projection is located within a contour line formed by the first hollow region on the projection plane, and at least a part of the second projection is located within a contour line formed by the second hollow region on the projection plane; and the first radiator comprises a first feeding connection point, the second radiator comprises a second feeding connection point, the first feeding connection point is connected to a first feed point, and the second feeding connection point is connected to a second feed point.

2. The antenna element according to claim 1, wherein when the antenna element is in a first operating frequency band, the first radiator is configured to be excited to generate a first resonance, and the radiator array is configured to be excited to generate a second resonance; or when the antenna element is in a second operating frequency band, the second radiator is configured to be excited to generate a third resonance, and the first radiator and the radiator array are configured to be excited to generate a fourth resonance.

3. The antenna element according to claim 1, wherein:

the radiator array is an axisymmetric structure;

the radiator array is ring-shaped;

the radiator array comprises N sub-radiator groups; and each sub-radiator group comprises a plurality of sub-radiators, and in the extension direction of the plane on which the radiator array is located, the plurality of sub-radiators in each sub-radiator group are spaced from each other and are adjacent to each other from head to tail to form a ring structure, wherein N is greater than or equal to 1.

4. The antenna element according to claim 3, wherein N is greater than or equal to 2, the N sub-radiator groups form N ring structures, the N ring structures formed by the N sub-radiator groups are concentrically disposed on a same plane, and form a multi-layer ring structure, and the second hollow region is an inner space enclosed by an innermost ring structure in the N ring structures.

5. The antenna element according to claim 1, wherein the second projection is completely located within the contour line formed by the second hollow region on the projection plane, and the second projection is completely located within the contour line formed by the first hollow region on the projection plane.

6. The antenna element according to claim 1, wherein the first radiator further comprises a third feeding connection point, the third feeding connection point is connected to a third feed point, the second radiator further comprises a fourth feeding connection point, and the fourth feeding connection point is connected to a fourth feed point;

an included angle between a first connection line from the first feeding connection point to a center point of the first radiator and a second connection line from the third feeding connection point to the center point of the first radiator is 90°; and an included angle between a third connection line from the second feeding connection point to a center point of the second radiator and a fourth connection line from the fourth feeding connection point to the center point of the second radiator is 90°.

7. The antenna element according to claim 1, wherein the first radiator is ring-shaped, and the first radiator is an axisymmetric structure; and the grounding component is a ring-shaped columnar structure, one end of the grounding component is connected to an inner edge of the first radiator, and the other end of the grounding component is connected to the ground plane; or the grounding component comprises a plurality of grounding posts spaced in a circumferential direction of the inner edge of the first radiator, and a first end of each of the plurality of grounding posts is connected to the inner edge of the first radiator.

8. The antenna element according to claim 7, wherein the plurality of grounding posts are evenly distributed in the circumferential direction of the inner edge of the first radiator.

9. The antenna element according to claim 8, wherein the first radiator comprises a first axis of symmetry and a second axis of symmetry that are perpendicular to each other, and the first radiator, the second radiator, and the radiator array are all symmetrical with respect to the first axis of symmetry and the second axis of symmetry; and a central axis of the first radiator, a central axis of the second radiator, and a central axis of the radiator array coincide.

10. The antenna element according to claim 1, wherein the first radiator, the second radiator, and the radiator array are each a sheet-like radiator.

11. An electronic device, comprising an antenna element, the antenna element comprising:

a first radiator and a grounding component, wherein in a height direction of the antenna element, the first radiator is spaced from a ground plane and disposed opposite to the ground plane, and the first radiator is connected to the ground plane through the grounding component;

a second radiator, wherein the second radiator is spaced from the first radiator, and in the height direction of the antenna element, the second radiator is spaced from the ground plane and disposed opposite to the ground plane; and a radiator array, wherein in the height direction of the antenna element, the radiator array is spaced from the first radiator and disposed opposite to the first radiator, and the radiator array is located on a first side that is of the first radiator and that is further from the ground plane than a second side of the first radiator that is closest to the ground plane; and the radiator array comprises at least two sub-radiators, and the at least two sub-radiators are spaced from each other in an extension direction of a plane on which the radiator array is located, wherein the first radiator comprises a first hollow region, and the radiator array comprises a second hollow region;

a plane parallel to a plane on which the ground plane is located is used as a projection plane, a projection of the first radiator on the projection plane is a first projection, a projection of the second radiator on the projection plane is a second projection, and a projection of the radiator array on the projection plane is a third projection; and the first projection and the third projection at least partially overlap, at least a part of the second projection is located within a contour line formed by the first hollow region on the projection plane, and at least a part of the second projection is located within a contour line formed by the second hollow region on the projection plane; and the first radiator comprises a first feeding connection point, the second radiator comprises a second feeding connection point, the first feeding connection point is connected to a first feed point, and the second feeding connection point is connected to a second feed point.

12. The electronic device according to claim 11, wherein the electronic device comprises a plurality of antenna elements, and the plurality of antenna elements are distributed in an array form in the electronic device.

13. The electronic device according to claim 11, wherein the electronic device further comprises a dielectric structure, and the first radiator, the second radiator, and the radiator array are all disposed in the dielectric structure.

14. The electronic device according to claim 11, wherein the electronic device further comprises a rear cover and a dielectric structure, the radiator array is attached to a surface of the rear cover that faces an interior of the electronic device, and the first radiator and the second radiator are disposed in the dielectric structure.

15. The electronic device according to claim 11, wherein the electronic device further comprises a rear cover and a metal fence structure, the rear cover is disposed opposite to the antenna element, and the metal fence structure presses against the rear cover and the ground plane, the antenna element is enclosed in space formed by the metal fence structure, the rear cover, and the ground plane.

16. The electronic device according to claim 11, wherein the first radiator comprises a first conductive member disposed in the electronic device, the second radiator comprises a second conductive member disposed in the electronic device, and the radiator array comprises a third conductive member disposed in the electronic device; or the first radiator comprises a first part of a conductive layer of a PCB board, the second radiator comprises a second part of the conductive layer of the PCB board, the radiator array comprises a third part of the conductive layer of the PCB board, and the ground plane comprises a part of a grounding plane of the PCB board.

17. The electronic device according to claim 11, wherein the first radiator, the second radiator, and the radiator array are each a sheet-like radiator.

18. The electronic device according to claim 11, wherein the first radiator is ring-shaped, and the first radiator is an axisymmetric structure; and the grounding component is a ring-shaped columnar structure, one end of the grounding component is connected to an inner edge of the first radiator, and the other end of the grounding component is connected to the ground plane.

19. The electronic device according to claim 11, wherein the first radiator is ring-shaped, and the first radiator is in an axisymmetric structure; and the grounding component comprises a plurality of grounding posts spaced in a circumferential direction of an inner edge of the first radiator, and a first end of each of the plurality of grounding posts is connected to the inner edge of the first radiator.

20. The electronic device according to claim 19, wherein the plurality of grounding posts are evenly distributed in the circumferential direction of the inner edge of the first radiator.

* * * * *